(12) United States Patent
Yamauchi et al.

(10) Patent No.: US 9,563,465 B2
(45) Date of Patent: Feb. 7, 2017

(54) MULTI-TASK SCHEDULING METHOD FOR ASSIGNING THREADS BASED ON TIME SLICES TO MULTI-CORE PROCESSORS AND MULTI-CORE PROCESSOR SYSTEM THEREFOR

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP); Fumihiko Hayakawa, Kawasaki (JP); Naoki Odate, Akiruno (JP); Tetsuo Hiraki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 389 days.

(21) Appl. No.: 13/934,696

(22) Filed: Jul. 3, 2013

(65) Prior Publication Data
US 2013/0298137 A1 Nov. 7, 2013

Related U.S. Application Data

(63) Continuation of application No. PCT/JP2011/050219, filed on Jan. 7, 2011.

(51) Int. Cl.
*G06F 9/46* (2006.01)
*G06F 9/48* (2006.01)

(52) U.S. Cl.
CPC .............. *G06F 9/46* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 5,544,316 A * | 8/1996 | Carpenter et al. | ............ 719/310 |
| 5,781,775 A | 7/1998 | Ueno | |
| 6,581,089 B1 | 6/2003 | Imamura | |
| 7,412,703 B2 * | 8/2008 | Cleary et al. | ................. 718/102 |
| 8,560,876 B2 * | 10/2013 | Driesen et al. | ............... 713/600 |
| 2009/0070772 A1* | 3/2009 | Shikano | ........................ 718/106 |
| 2009/0198961 A1* | 8/2009 | Sridhar | ................. G06F 9/4812 |
| | | | 712/203 |

(Continued)

FOREIGN PATENT DOCUMENTS

| | | |
|---|---|---|
| JP | 07-281909 A | 10/1995 |
| JP | 2009-069921 A | 10/1995 |

(Continued)

OTHER PUBLICATIONS

International Search Report, PCT/JP2011/050219, filed Jan. 7, 2011.

Primary Examiner — Wissam Rashid
(74) Attorney, Agent, or Firm — Arent Fox LLP

(57) ABSTRACT

A multi-task scheduling method includes assigning a first thread to a first processor; detecting a second thread that is executed after the first thread; calculating based on a load of a processor that is assigned a third thread that generates the second thread, a first time that lasts until a start of the second thread; calculating a second time that lasts until completion of execution of the first thread; and changing a first time slice of the first processor to a second time slice when the second time is greater than the first time.

9 Claims, 23 Drawing Sheets

(56) References Cited

U.S. PATENT DOCUMENTS

2010/0031254 A1* 2/2010 Chin .................. G06F 9/45533
718/1

FOREIGN PATENT DOCUMENTS

| | | |
|---|---|---|
| JP | 09-128351 A | 5/1997 |
| JP | 10-074150 A | 3/1998 |
| JP | 11-306037 A | 11/1999 |

* cited by examiner

FIG.4

| PROCESS ID | THREAD ID | ALLOCATED CPU | CLOCK FREQUENCY | EXECUTION START TIME | SCHEDULED EXECUTION COMPLETION TIME |
|---|---|---|---|---|---|
| PROCESS #0 | THREAD #0 | EXECUTION COMPLETED | 500 [MHz] | - | - |
| | THREAD #1 | CPU #1 | 500 [MHz] | - | - |
| | THREAD #2 | NOT ASSIGNED | 500 [MHz] | - | - |
| | THREAD #3 | NOT ASSIGNED | 500 [MHz] | - | - |
| PROCESS #1 | - | CPU #1 | 500 [MHz] | - | - |
| PROCESS #2 | - | CPU #1 | 500 [MHz] | - | - |

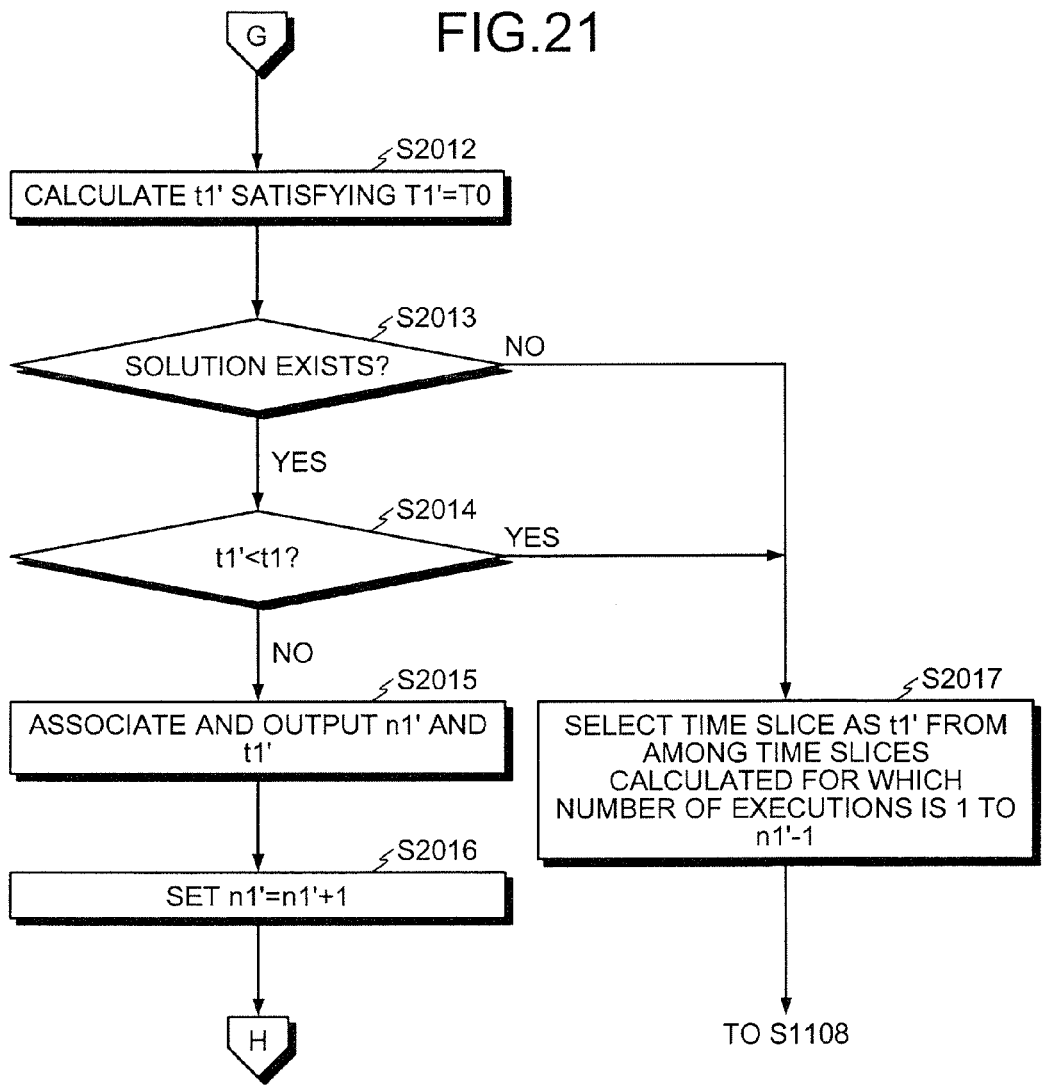

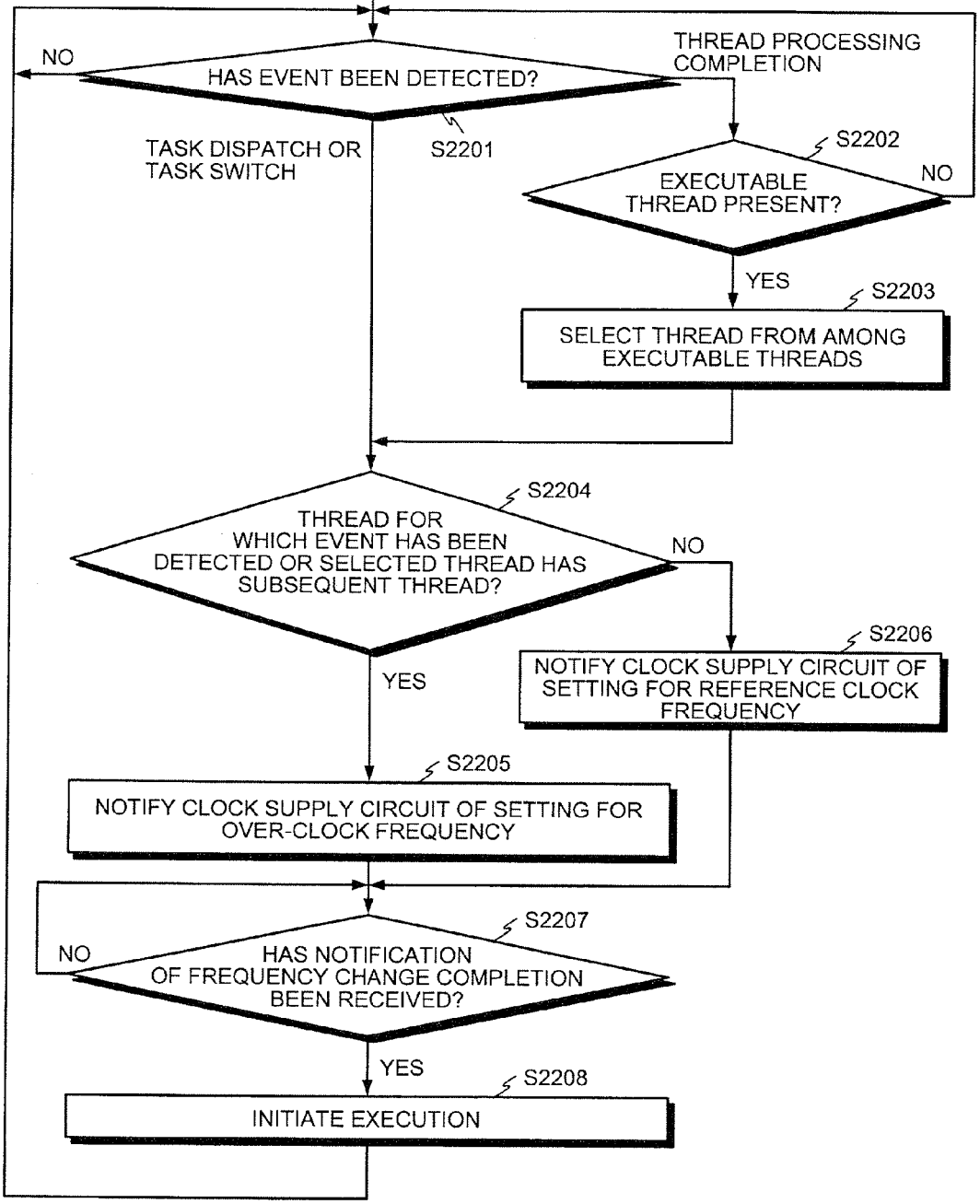

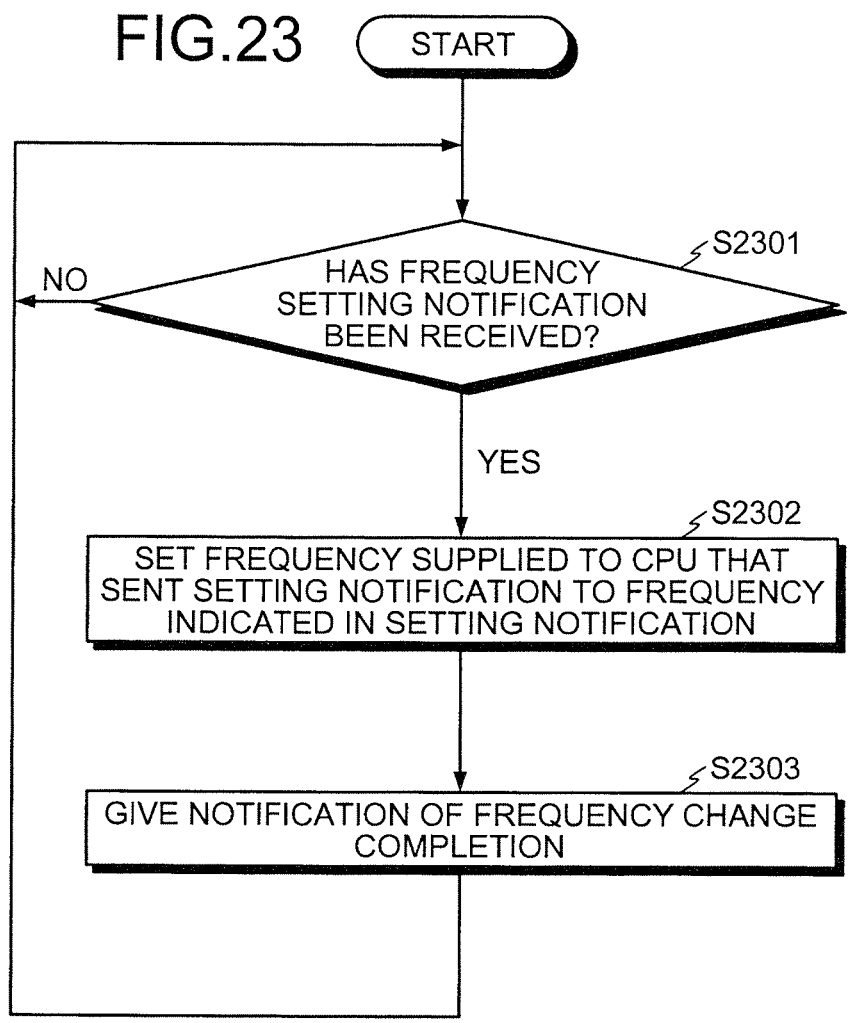

MULTI-TASK SCHEDULING METHOD FOR ASSIGNING THREADS BASED ON TIME SLICES TO MULTI-CORE PROCESSORS AND MULTI-CORE PROCESSOR SYSTEM THEREFOR

CROSS REFERENCE TO RELATED APPLICATIONS

This application is a continuation application of International Application PCT/JP2011/050219, filed on Jan. 7, 2011 and designating the U.S., the entire contents of which are incorporated herein by reference.

FIELD

The embodiments discussed herein are related to a multi-task scheduling method for assigning threads to multi-core processors and a multi-core processor system.

BACKGROUND

A technique (multi-task) is known that makes application programs appear to the user as if they are executed at the same time by switching and executing the application programs in turn by a central processing unit (CPU). The application program is herein referred to as a process.

A technique (multi-thread) is also known that divides one process into multiple functions so that the CPU executes the functions in parallel by time sharing. The divided functions are herein referred to as threads. In a single-core processor system, the thread execution sequence is fixed when performing the multi-thread.

In a multi-core processor system, threads of multiple processes are present on CPUs when performing the multi-task multi-thread. The execution sequence defined in a given process may vary by the effect of a thread of another process assigned to the same CPU to which a thread of the given process is assigned.

When a multi-thread program (conventional program) running on the single-core processor system is moved to the multi-core processor system, a problem arises in that the order of access to shared data shared by the threads may shift as a result of a shift in the thread execution sequence. This leads to a problem in that the shared data may have incorrect values. Conventionally, to solve the problem that the shared data have incorrect values, the developer embeds synchronous code into existing program code (see, e.g., Japanese Laid-Open Patent Publication No. 2009-69921) to thereby fix the thread execution sequence.

However, the existing program code has a massive scale and therefore, when performing the code embedding and quality assurance, the development cost will increase significantly. Assembler language description at a timing-critical portion may cause another problem in that, if the synchronous code is embedded at the portion, performance degradation consequent to the embedding of the synchronous code will increase with respect to the required performance.

SUMMARY

According to an aspect of an embodiment, a multi-task scheduling method includes assigning a first thread to a first processor; detecting a second thread that is executed after the first thread; calculating based on a load of a processor that is assigned a third thread that generates the second thread, a first time that lasts until a start of the second thread; calculating a second time that lasts until completion of execution of the first thread; and changing a first time slice of the first processor to a second time slice when the second time is greater than the first time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view of an example of a thread management table;
FIGS. 20 and 21 are flowcharts of a detailed example of the time slice calculation process (step S1116) depicted in FIG. 11;
FIG. 22 is a flowchart of an information processing procedure performed by CPUs;
and
FIG. 23 is a flowchart of a setting process procedure performed by the clock supply circuit 210.

DESCRIPTION OF EMBODIMENTS

Preferred embodiments of a multi-task scheduling method and a multi-core processor system will be described in detail with reference to the accompanying drawings. In the multi-core processor system, a multi-core processor is a processor equipped with multiple cores. As long as multiple cores are provided, the multi-core processor may be a single processor equipped with multiple cores or a group of single-core processors in parallel. In this embodiment, for the purpose of simplification of description, a group of single-core processors in parallel will be described as an example.

Figure 1:
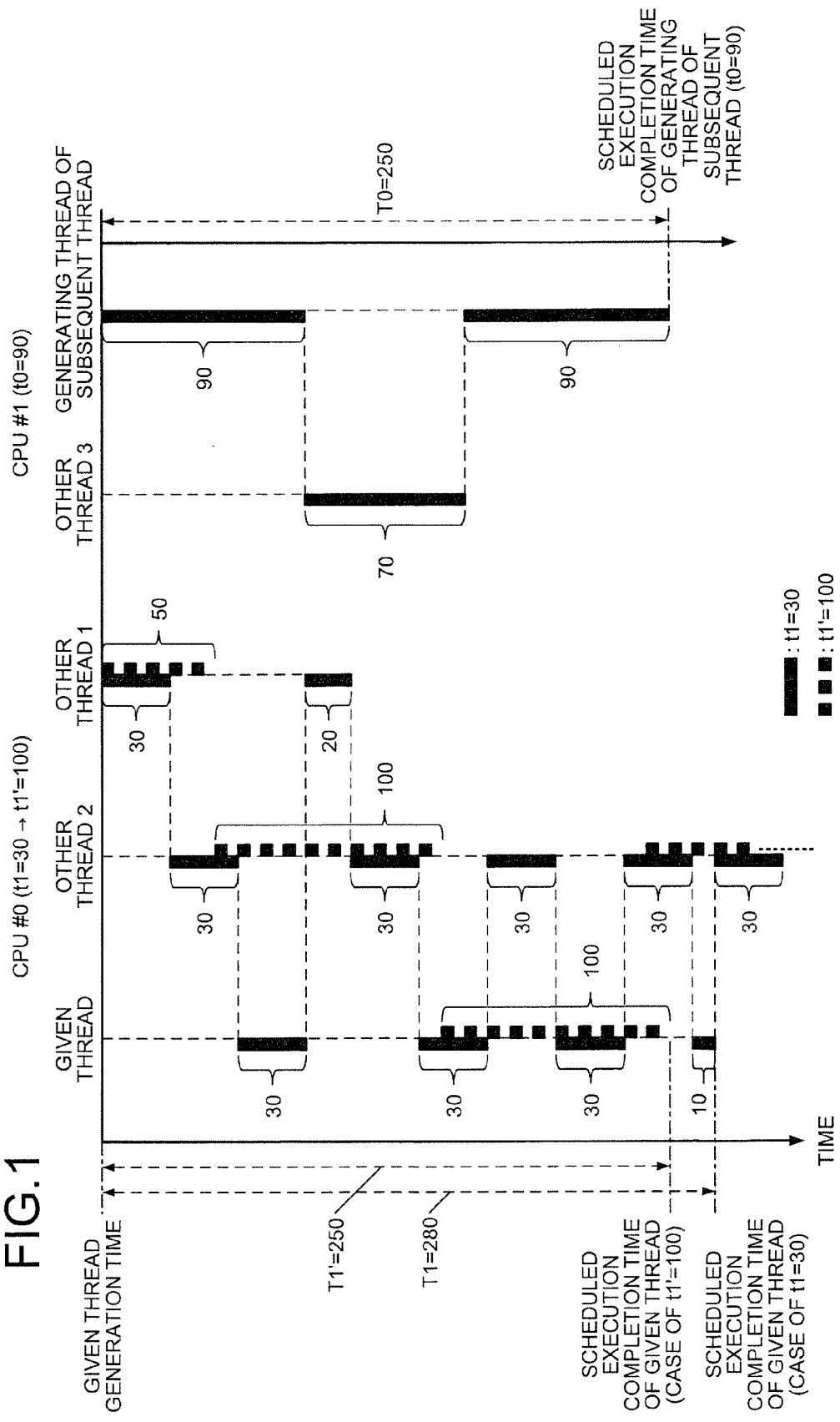
FIG. 1 is an explanatory view of an embodiment.

FIG. 1 is an explanatory view of an embodiment. Threads 1 and 2 are assigned to a CPU #0 of the multi-core processor. A thread 3 and a generating thread that generates subsequent threads that are defined to be executed subsequent to a given thread are assigned to a CPU #1 of the multi-core processor.

A time slice of the CPU #0 is 30 [ms] and the time slice of the CPU #1 is 90 [ms]. A time slice is the processing time required for one execution of each thread when among the CPUs, the threads assigned to a CPU are switched and executed. t1 is the time slice of a CPU to which the given thread is assigned and t0 is the time slice of a CPU to which the generating thread is assigned.

When the given thread is assigned to the CPU #0, the CPU #0 detects a subsequent thread of the given thread. The CPU #0 determines whether the scheduled execution completion time of the given thread is prior to the execution start time of the subsequent thread. Herein, the execution start time of a subsequent thread is the scheduled execution completion time of the generating thread that generates the subsequent thread. A first time (T0) from the generation time of the given thread to the scheduled execution completion time of the generating thread is 250 [ms]. A second time (T1) from the generation time of the given thread to the scheduled execution completion time of the given thread is 280 [ms].

Thus, the scheduled execution completion time of the generating thread is determined to be prior to the scheduled execution completion time of the preceding thread, and hence, the CPU #0 adjusts the time slice so that the scheduled execution completion time of the generating thread is after the scheduled execution completion time of the given thread. For example, the CPU #0 calculates the time slice of the CPU #0 based on the processing time of threads assigned to the CPU #0 and based on the number of times the given thread is executed until completion. t1' is the time slice of the CPU such that the scheduled execution completion time of the generating thread comes after the scheduled execution completion time of the given thread.

The number of executions of the given thread is four when the time slice of the CPU #0 is 30 [ms]. In this example, t1' is the time slice calculated when the number (n1') of executions of the given thread is one. A calculation equation will be described in detail later in a first embodiment. The processing time of the thread 1 is 50 [ms], the processing time of the thread 2 is 150 [ms], and the processing time of the given thread is 100 [ms]. The CPU #0 calculates the time slice of the CPU #0 as follows.

$T0$=thread 1 processing time+$n1$'×$t1$'+given thread processing time

250 [ms]=50 [ms]+$t1$'+100

$t1$'=100 [ms]

The CPU #0 sets the time slice of the CPU #0 to which the given thread is assigned to 100 [ms]. As a result, the scheduled execution completion time of the generating thread comes after the scheduled execution completion time of the given thread, enabling the execution of the subsequent thread to start after the completion of execution of the given thread.

Although in the example described in FIG. 1, the time slice of the CPU to which the given thread is assigned is adjusted, configuration is not limited hereto and the adjustment may be made of the CPU to which the generating thread that generates subsequent threads is assigned.

Figure 2:
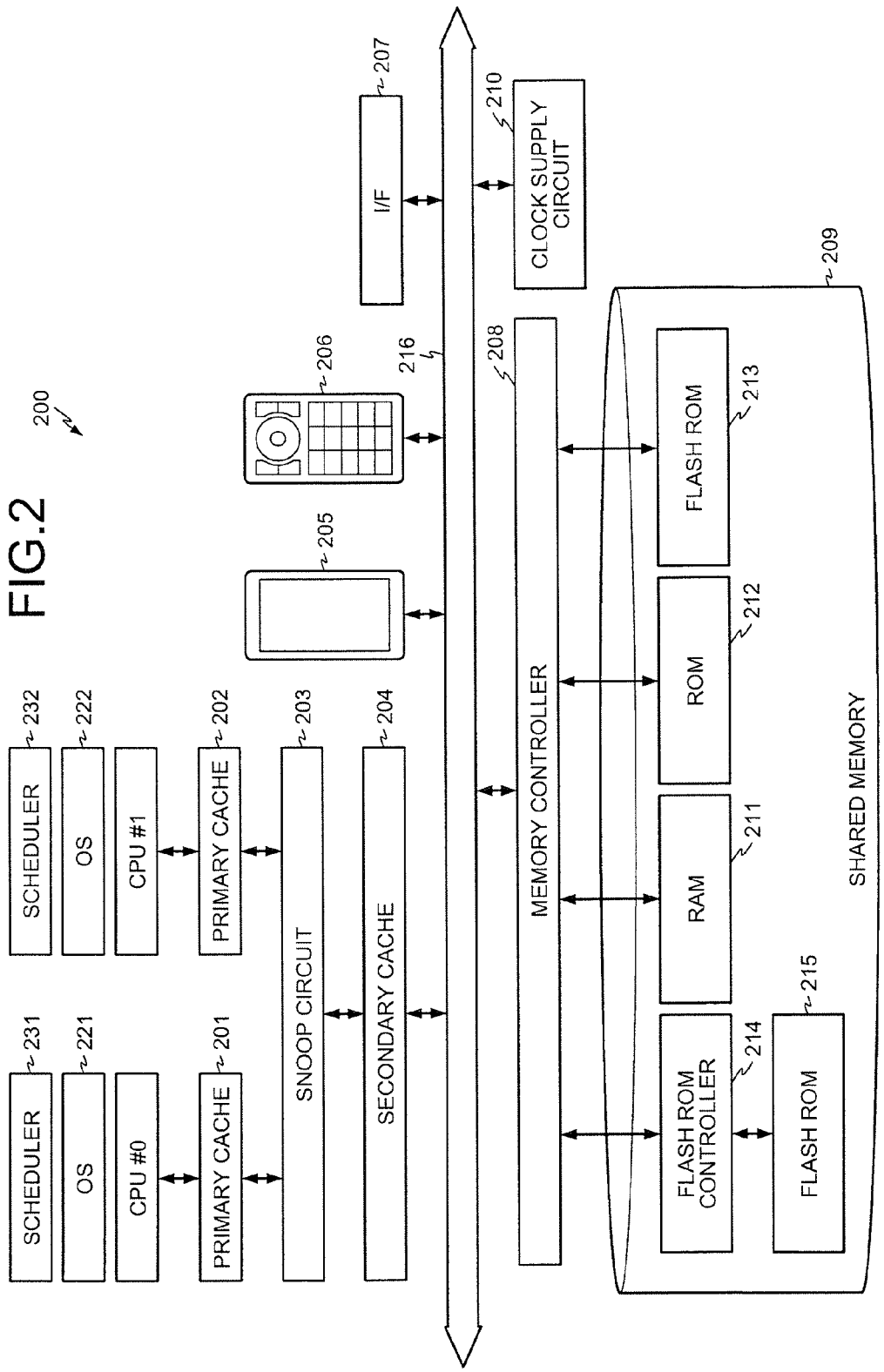
FIG. 2 is a block diagram of hardware of a multi-core processor system.

FIG. 2 is a block diagram of hardware of a multi-core processor system. In FIG. 2, a multi-core processor system 200 includes the CPU #0, the CPU #1, a primary cache 201, a primary cache 202, a snoop circuit 203, and a secondary cache 204. The multi-core processor system 200 further includes a display 205, a keyboard 206, an interface (I/F) 207, a memory controller 208, a shared memory 209, and a clock supply circuit 210. The secondary cache 204, the display 205, the keyboard 206, the I/F 207, the memory controller 208, and the clock supply circuit 210 are connected via a bus 216.

The CPUs #0 and #1 each have a register and a core. The CPU #0 is a master CPU that provides overall control of the multi-core processor system 200 and that executes an operating system (OS) 221. The OS 221 is a master OS that has a function of controlling to which CPU of which multi-core processor, a generated thread is to be assigned and that executes a thread assigned to the CPU #0. The OS 221 includes a scheduler 231 that has a function of switching and executing for each time slice, a thread assigned to the CPU #0.

The CPU #1 is a slave CPU that executes an OS 222. The OS 222 is a slave OS that executes a thread assigned to the CPU #1. The OS 222 includes a scheduler 232 that has a function of switching and executing for each time slice, a thread assigned to the CPU #1.

The CPU #0 is connected to the units by way of the primary cache 201, the snoop circuit 203, and the secondary cache 204. The primary caches 201 and 202 each include a cache memory and a cache controller. The primary cache 201 temporarily stores data written to the shared memory 209 by a thread executed by the OS 221.

The primary cache 201 temporarily stores data read out from the shared memory 209. The primary cache 202 temporarily stores data written to the shared memory 209 by a thread executed by the OS 222. The primary cache 202 temporarily stores data read out from the shared memory 209.

When data shared by the primary caches 201 and 202 is updated by one of the caches, the snoop circuit 203 detects the update and also updates the other cache.

The secondary cache 204 includes a cache memory and a cache controller. The secondary cache 204 stores data expelled from the first cache 201 or 202. The secondary cache 204 stores data shared by the OSs 221 and 222. The secondary cache 204 has a larger storage capacity and a lower speed of access from the CPUs than the first 201 and second 202 caches. The secondary cache 204 has a smaller storage capacity and a higher speed of access from the CPUs than the shared memory 209.

The display 205 displays, for example, data such as text, images, functional information, etc., in addition to a cursor, icons, and/or tool boxes. A thin-film-transistor (TFT) liquid crystal display and the like may be employed as the display 205.

The keyboard 206 includes, for example, keys for inputting letters, numerals, and various instructions and performs the input of data. Alternatively, a touch-panel-type input pad or numeric keypad, etc. may be adopted.

The I/F 207 is connected to a network such as a local area network (LAN), a wide area network (WAN), and the Internet through a communication line and is connected to other apparatuses through the network. The I/F 207 administers an internal interface with the network and controls the input and output of data with respect to external apparatuses. For example, a modem or a LAN adaptor may be employed as the I/F 207.

The shared memory 209 is a memory shared by the CPUs #0 and #1 and includes, for example, a random access memory (RAM) 211, a read only memory (ROM) 212, a flash ROM 213, a flash ROM controller 214, and a flash ROM 215.

The RAM 211 is used as a work area of the CPUs. The ROM 212 stores a program such as a boot program. The flash ROM 213 stores system software such as the OSs 221 and 222 and application software, as well as a thread management table and thread dependence information, which will be described later. When updating the OSs for example, the multi-core processor system 200 receives a new OS via the I/F 207 and updates the old OS stored in the flash ROM 213 to the new OS.

The flash ROM controller 214 controls the reading and writing of data with respect to the flash ROM 215 under the control of the CPUs. The flash ROM 215 stores data written under the control of the flash ROM controller 214. Specific examples of data include image data, video data, etc. acquired via the I/F 207 by the user of the multi-core processor system 200. The flash ROM 215 can be for example a memory card or an SD card.

The clock supply circuit 210 supplies a clock to the components. In this embodiment, the CPUs can be supplied with a clock having a frequency of either 500 [MHz] or 1 [GHz]. For example, the clock supply circuit 210 has a flag for each of the CPUs. The flag is one bit. If the flag is 0, the clock supply circuit 210 supplies the clock of 500 [MHz] to the corresponding CPU and, if the flag is 1, the clock supply circuit 210 supplies the clock of 1 [GHz] to the corresponding CPU.

For example, upon receiving notification ("clock frequency setting notification") of CPU identification information and a flag setting value from each of the CPUs, the clock supply circuit 210 sets a flag corresponding to the received CPU identification information to the received flag setting value. After setting the flag, the clock supply circuit 210 sends notification of change completion to the CPU that sent the clock frequency setting notification.

Figure 3:
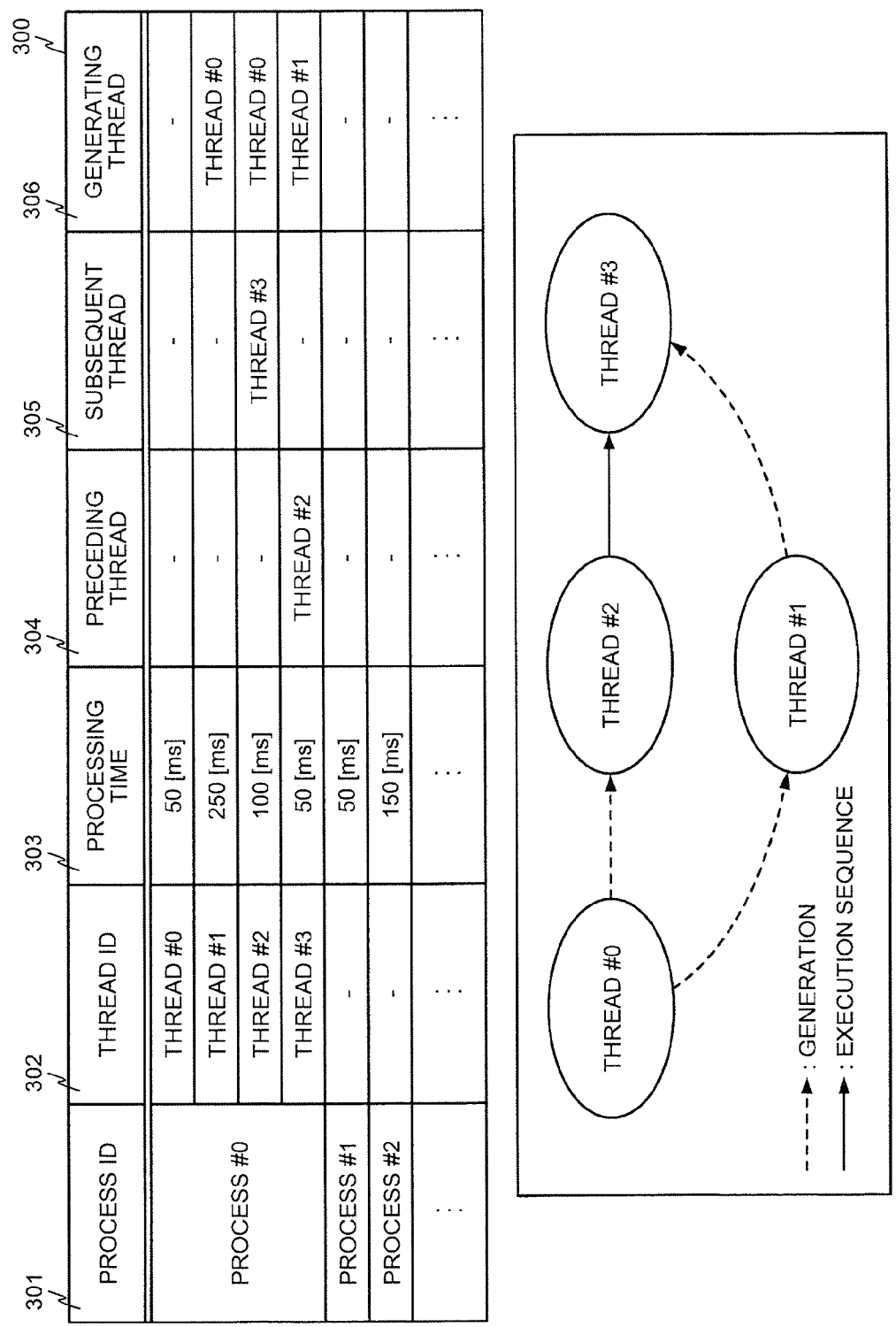
FIG. 3 is an explanatory view of an example of thread dependence information.

FIG. 3 is an explanatory view of an example of thread dependence information. Thread dependence information 300 is information that includes information indicating an execution sequence defined among threads and the processing time of each thread. The thread dependence information 300 includes a process ID field 301, a thread ID field 302, a processing time field 303, a preceding thread field 304, a subsequent thread field 305, and a generating thread field 306.

The process ID field 301 stores process identification information. The thread ID field 302 stores identification information of a thread of the process whose identification information is stored in the process ID field 301. As is commonly known, a thread is a unit of code executed in a process performed in an application program. A process is a unit of code that includes at least one thread. A process that includes only one thread is substantially the thread. A process having no identification information in the thread ID field 302 includes only one thread.

The processing time field 303 stores the processing time of a thread. The processing time is a time calculated by the developer with a clock frequency (reference clock frequency) as a reference for each CPU using a verification tool such as an electronic system level (ESL).

The preceding thread field 304 stores identification information of a thread that has a dependent relationship, in terms of output sequence, with the thread whose identification information is stored in the thread ID field 302 and that is executed prior to the thread. The subsequent thread field 305 stores identification information of a thread that has a dependent relationship, in terms of output sequence, with the thread whose identification information is stored in the thread ID field 302 and that is executed after the thread. The generating thread field 306 stores identification information of a generating thread that generates the thread whose identification information is stored in the thread ID field 302.

For example, a process #0 includes threads #0 to #3. The thread #0 of the process #0 generates the threads #1 and #3 of the process #0. The thread #1 of the process #0 generates the thread #3 of the process #0. The threads #2 and #3 of the process #0 have a dependent relationship in terms of output such that the thread #3 of the process #0 is executed subsequent to the completion of execution of the thread #2 of the process #0. The threads #0 and #1 of the process #0, the process #1, and the process #2 have no dependent relationship with other threads in terms of output. Although the thread dependence information 300 is stored in the shared memory 209 in the described above, the thread dependence information 300 may be stored in the secondary cache 204 as well.

FIG. 4 is an explanatory view of an example of a thread management table. A thread management table 400 is information recording to which CPU each thread of a process is assigned. In the thread management table 400, when a process is activated, thread identification information is entered for each process by the OS 221 that is the master OS. The thread management table 400 includes a process ID field 401, a thread ID field 402, an allocated CPU field 403, a clock frequency field 404, an execution start time field 405, and a scheduled execution completion time field 406.

The process ID field 401 stores process identification information. The thread ID field 402 stores identification information of a thread of the process whose identification information is stored in the process ID field 401. A process having no identification information stored in the thread ID field 402 includes only one thread.

The allocated CPU field 402 stores identification information of the CPU to which the thread whose identification information is stored in the thread ID field 402 is assigned. When, upon the generation of a thread, identification information of a CPU is entered into the allocated CPU field 403 corresponding to the thread, the thread is assigned to the CPU.

The clock frequency field 404 stores a CPU clock frequency at the time of execution of the thread whose identification information is stored in the thread ID field 402. In this embodiment, the reference clock frequency is 500 [MHz].

The execution start time field 405 stores a generation time of the thread whose identification information is stored in the thread ID field 402. The scheduled execution completion time field 406 stores a time obtained by adding a second time calculated in this embodiment to the thread generation time.

Figure 5:
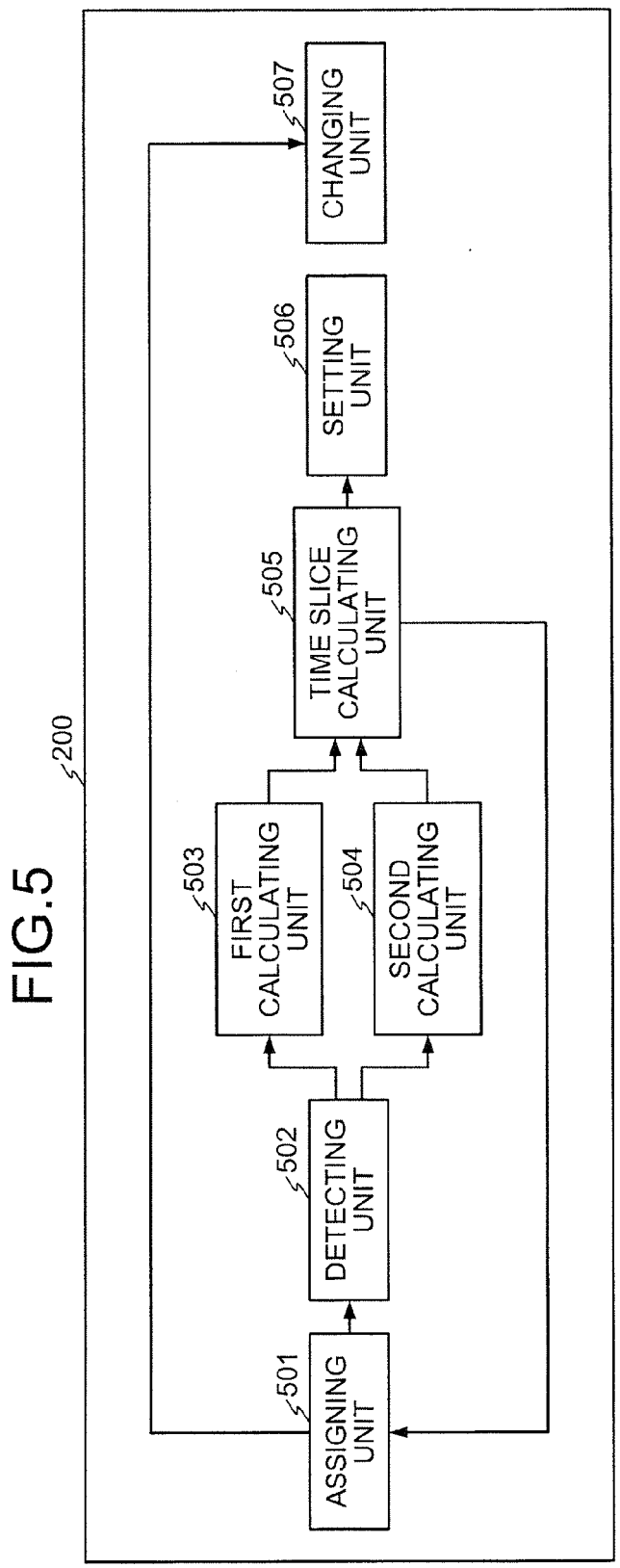
FIG. 5 is a functional diagram of a multi-core processor system 200.

FIG. 5 is a functional diagram of the multi-core processor system 200. The multi-core processor system 200 includes an assigning unit 501, a detecting unit 502, a first calculating unit 503, a second calculating unit 504, a time slice calculating unit 505, a setting unit 506, and a changing unit 507. For example, a program having functions of the assigning unit 501 to the changing unit 507 is stored in a storage device such as the shared memory 209. The CPU #0 or #1 accesses the storage device, reads the program and executes the program, thereby executing processing of the assigning unit 501 to the changing unit 507.

The assigning unit 501 assigns a first thread to a first CPU. The detecting unit 502 detects a second thread that is executed subsequent to the first thread. The detecting unit 502 detects the second thread based on the thread dependence information. Herein, the first thread is a given thread and the second thread is a subsequent thread.

The first calculating unit 503 calculates a first time until the start of the second thread based on the load of the CPU to which a third thread that generates the second thread is assigned. The third thread is a generating thread that generates the subsequent thread.

The second calculating unit 504 calculates a second time until the completion of execution of the first thread. The setting unit 506 changes a first time slice of the first CPU to a second time slice if the second time is greater than the first time. The first slice of the first CPU is a preset time slice.

The time slice calculating unit 505 calculates the second time slice such that the first time becomes substantially equal to the second time. When the second time is greater than the first time, the setting unit 506 changes the first time slice of the first CPU to the second time slice calculated by the time slice calculating unit 505.

The changing unit 507 changes the clock frequency during the execution of the first thread. The assigning unit 501 further assigns a second thread to a CPU having the least load.

The assigning unit 501 assigns the second thread to the first CPU when the second time slice is not obtained by the time slice calculating unit 505. In light of the above, details will be described using first and second embodiments.

In a first embodiment, a case will be described in which a preceding thread is assigned among the threads whose execution sequence is defined. For example, the multi-core processor system 200 detects an assignment of the preceding thread to the first CPU of the multi-core processors. The multi-core processor system 200 then determines whether the scheduled execution completion time of a preceding thread is after the scheduled execution completion time of a generating thread that generates a subsequent thread that follows the preceding thread and that is assigned to the second CPU different from the first CPU.

If the multi-core processor system 200 determines that the scheduled execution completion time of the generating thread is prior to the scheduled execution completion time of the preceding thread, the multi-core processor system 200 adjusts the time slice of at least one among a first core and a second core such that the scheduled execution completion time of the generating thread comes after the scheduled execution completion time of the preceding thread. For example, the multi-core processor system 200 calculates the time slice of at least one core based on the processing time of a thread assigned to the core and on the number of executions until the completion of the processing of the preceding thread or the generating thread. The multi-core processor system 200 sets the time slice of the core to the calculated time slice.

If the multi-core processor system 200 cannot calculate a time slice of the CPU (core) such that the scheduled execution completion time of the generating thread comes after the scheduled execution completion time of the preceding thread, the given thread is assigned to the second CPU. When the given thread is assigned to the second CPU, the multi-core processor system 200 does not change the time slice of the core. If a subsequent thread is generated when the given thread is assigned to the second CPU, the multi-core processor system 200 assigns the subsequent thread to the second CPU.

The multi-core processor system 200 does not change the time slice of the core if it is determined that the scheduled execution completion time of the generating thread is after the scheduled execution completion time of the preceding thread. Detailed description will be given with reference to FIGS. 6 to 8.

Figure 6:
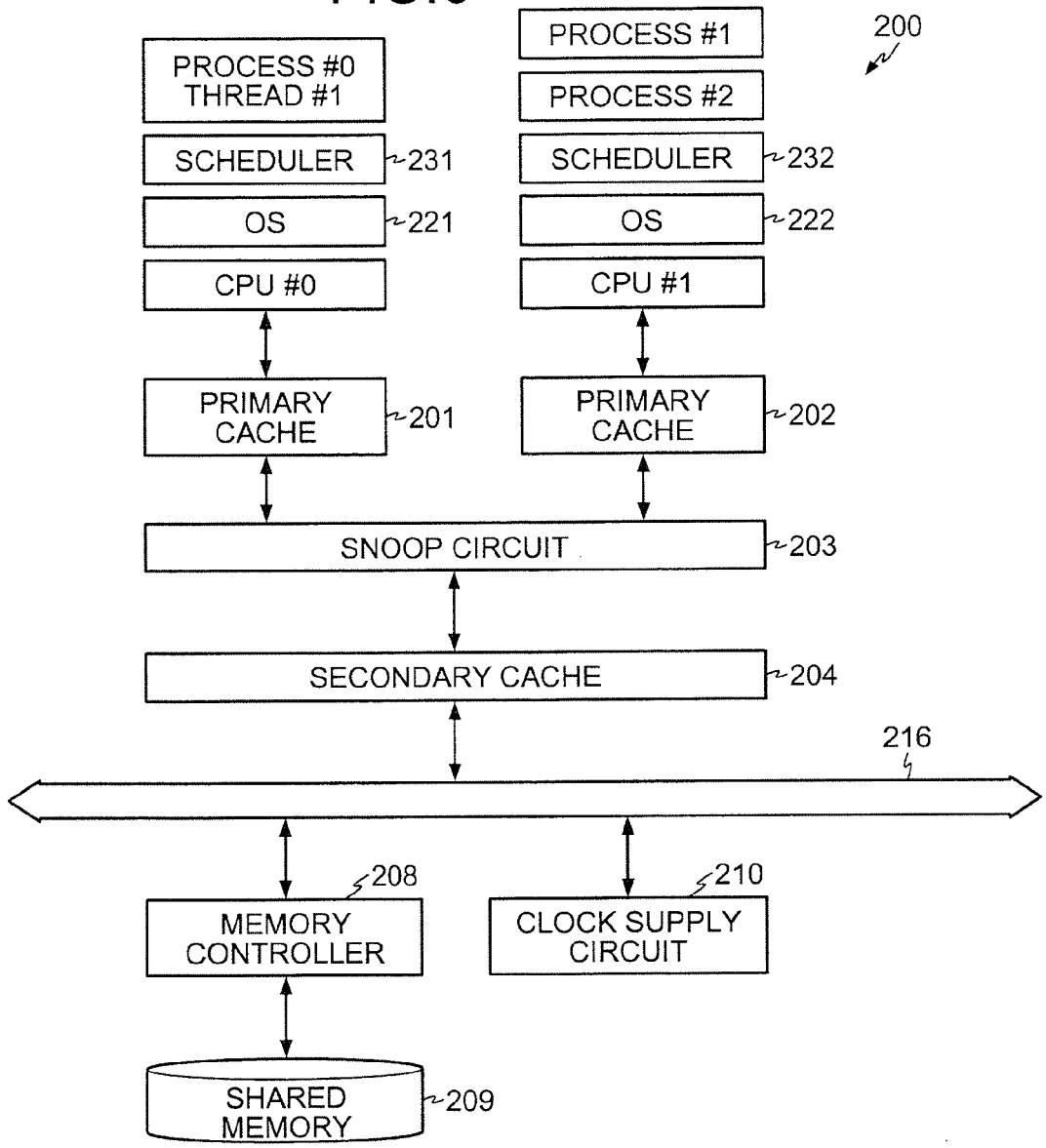
FIG. 6 is an explanatory view of an assignment example of threads.

FIG. 6 is an explanatory view of an assignment example of the threads. In FIG. 6, the thread #1 of the process #0 is assigned to the CPU #0 and the processes #1 and #2 are assigned to the CPU #1.

The OS 221 detects generation of the thread #2 of the process #0. The OS 221 then identifies the generation time of the thread #2. The OS 221 detects a subsequent thread of the thread #2 of the process #0, based on the thread dependence information 300. For example, the OS 221 refers to thread identification information entered in the subsequent thread field 305 corresponding to the thread #2 of the process #0 in the thread dependence information 300, and thereby enables detection of the subsequent thread In this case, from the subsequent thread field 305 corresponding to the thread #2 of the process #0 in the thread dependence information 300, the thread #3 of the process #0 is detected as a subsequent thread of the thread #2 of the process #0.

The OS 221 then calculates the total processing time of the threads assigned to the CPUs based on the thread dependence information 300, to thereby identify the CPU having the least load. In this case, the total processing time of threads assigned to the CPU #0 is 250 [ms] and the total processing time of threads assigned to the CPU #1 is 200 [ms]. The CPU #1 is thus identified as the CPU having the least load. The OS 221 then regards the identified CPU #1 as an interim CPU of the thread #2 of the process #0 and notifies the OS 222 of the interim assignment of the thread #2 of the process #0 via the snoop circuit 203.

When the OS 222 receives the interim assignment of the thread #2 of the process #0, the OS 222 calculates the second time (T1) from the generation time of the thread #2 of the process #0 to the scheduled execution completion time of the thread #2 of the process #0. The OS 222 calculates T1 using Equation (1) below.

$$T1 = \sum_{n=0}^{N-1} \text{if} \left( \begin{array}{l} n\text{-}th \text{ thread processing time} \leq \\ \text{given thread processing time} \end{array} \right) \quad (1)$$

$n\text{-}th$ thread processsing time ELSE $n1 \times t1$

Where, N is the total number of threads and given threads that have been assigned to an interim CPU (CPU #1). An n-th thread indicates a thread that is sequentially selected from among threads including the threads and the given threads assigned to the interim CPU (CPU #1). t1 is a time slice of the interim CPU. n1 is the number of executions performed until the processing of a given thread is completed when execution is performed switching between the given thread and another thread. n1 is calculated from Equation (2) below. n1 is rounded up to a whole number.

$$n1 = \text{given thread processing time}/t1 \quad (2)$$

The OS 222 calculates a first time (T0) from the generation time of the thread #2 of the process #0 to the scheduled execution completion time of the generating thread that generates the thread #3, which is of the process #0 and a subsequent thread of the thread #2 of the process #0. In this case, the generating thread that generates the thread #3 of the process #0 is the thread #1 of the process #0. The OS 222 calculates T0 using Equation (3) below.

$$T0 = \sum_{m=0}^{M-1} \text{if} \left( \begin{array}{l} m\text{-}th \text{ thread processing time} \leq \\ \text{given thread processing time} \end{array} \right) \quad (3)$$

$m\text{-}th$ thread processsing time ELSE $n0 \times t0$

Where, M is a thread count of threads assigned to the CPU (CPU #0) to which the generating thread that generates a subsequent thread has been. m-th thread indicates a thread that is sequentially selected from among threads assigned to the CPU (CPU #0) to which the generating thread has been assigned. t0 is a time slice of the CPU to which the generating thread has been assigned. n0 is a number of changeovers of the given thread until the completion of execution of the given thread. n0 is calculated from Equation (4) below. n0 is rounded up to a whole number.

$$n0 = \text{generating thread processing time}/t0 \quad (4)$$

Figure 7:
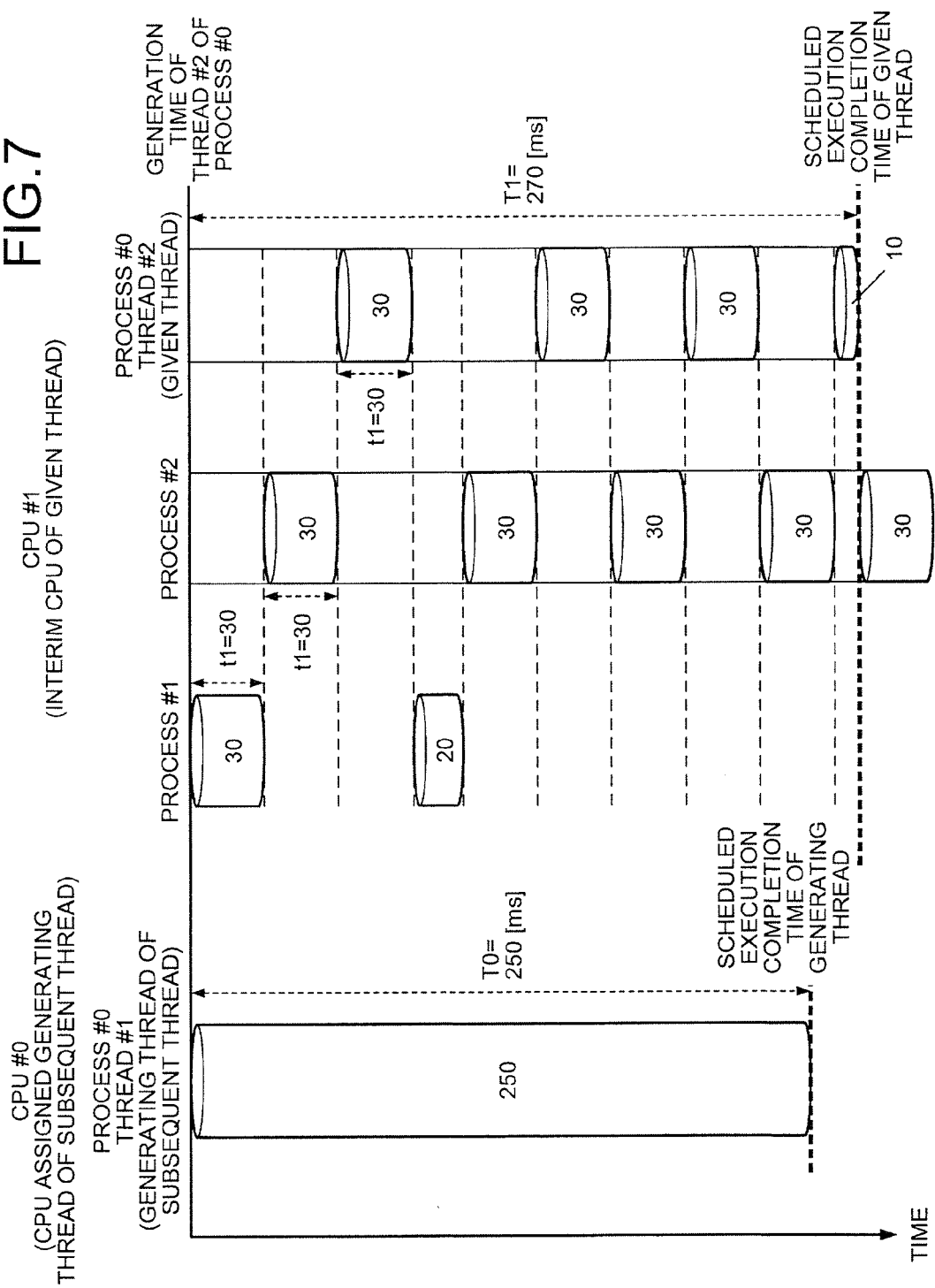
FIG. 7 is a diagram depicting T0 and T1.

FIG. 7 is a diagram depicting T0 and T1. Here, the time slice is assumed to be 30 [ms] for both the CPU #1 that is the interim CPU of the given thread and the CPU #0 that is the CPU to which the generating thread that generates a subsequent thread has been assigned. Since only the thread #1 of the process #0 has been assigned to the CPU #0, T0 is 250 [ms].

Calculation of T1 will be described.

$$T1 = 0$$
$$n1 = \text{processing time of thread \#2 of process \#0}/\text{time slice of } CPU \ \#1$$
$$= 100[\text{ms}]/30[\text{ms}]$$
$$= 4$$
$$n1 \times t1 = 4 \times 30[\text{ms}]$$
$$= 120[\text{ms}]$$

Since n1 is 4, the thread #2 of the process #0 is divided into 4 executions. The processes #1 and #2 are assigned to the CPU #1. The processing time of the process #1 is 50 [ms] and the processing time of the thread #2 of the process #0 is 100 [ms]. Hence, the processing time of the process #1 is less than that of the given thread, i.e., the thread #2 of the process #0. Therefore, the processing time of the process #1 is added to T1.

The processing time of the process #2 is 150 [ms] and the processing time of the thread #2 of the process #0 is 100 [ms]. Hence, the processing time of the process #2 is greater than that of the given thread, i.e., the thread #2 of the process #0. Therefore, n1×t1 is added to T1.

$$T1 = \text{processing time of process \#1} + n1 \times t1 + \text{processing time of thread \#2 of process \#0}$$
$$= 50[\text{ms}] + 120[\text{ms}] + 100[\text{ms}]$$
$$= 270[\text{ms}]$$

The OS 222 determines whether the calculated T1 is less than the calculated T0. Since T0 is 250 [ms] and T1 is 270 [ms], the OS 222 determines that T1 is not less than T0. T1 being not less than T0 means that the execution of the thread #1 of the process #0 is completed before the completion of the thread #2 of the process #0, allowing the start of the thread #3 of the process #0 (i.e., the subsequent thread of the thread #2 of the process #0).

The OS 222 then calculates the time slice (t1′) by which T1′ becomes equal to T0 using Equation (5) below.

$$T1' = \sum_{n=0}^{N-1} \text{if} \left( \begin{array}{l} n\text{-}th \text{ thread processing time} \leq \\ \text{given thread processing time} \end{array} \right) \quad (5)$$
$$n\text{-}th \text{ thread processing time ELSE } n1' \times t1'$$

Here, n1′ is calculated until the value of t1′ becomes less than or equal to t1.

$$n1'=1$$

T1′=processing time of process #1+n1′×t1′+processing time of thread #2 of process #0=T0

50 [ms]+t1′+100 [ms]=250 [ms]

t1′=250 [ms]−150 [ms]

t1′=100 [ms]

Figure 8:
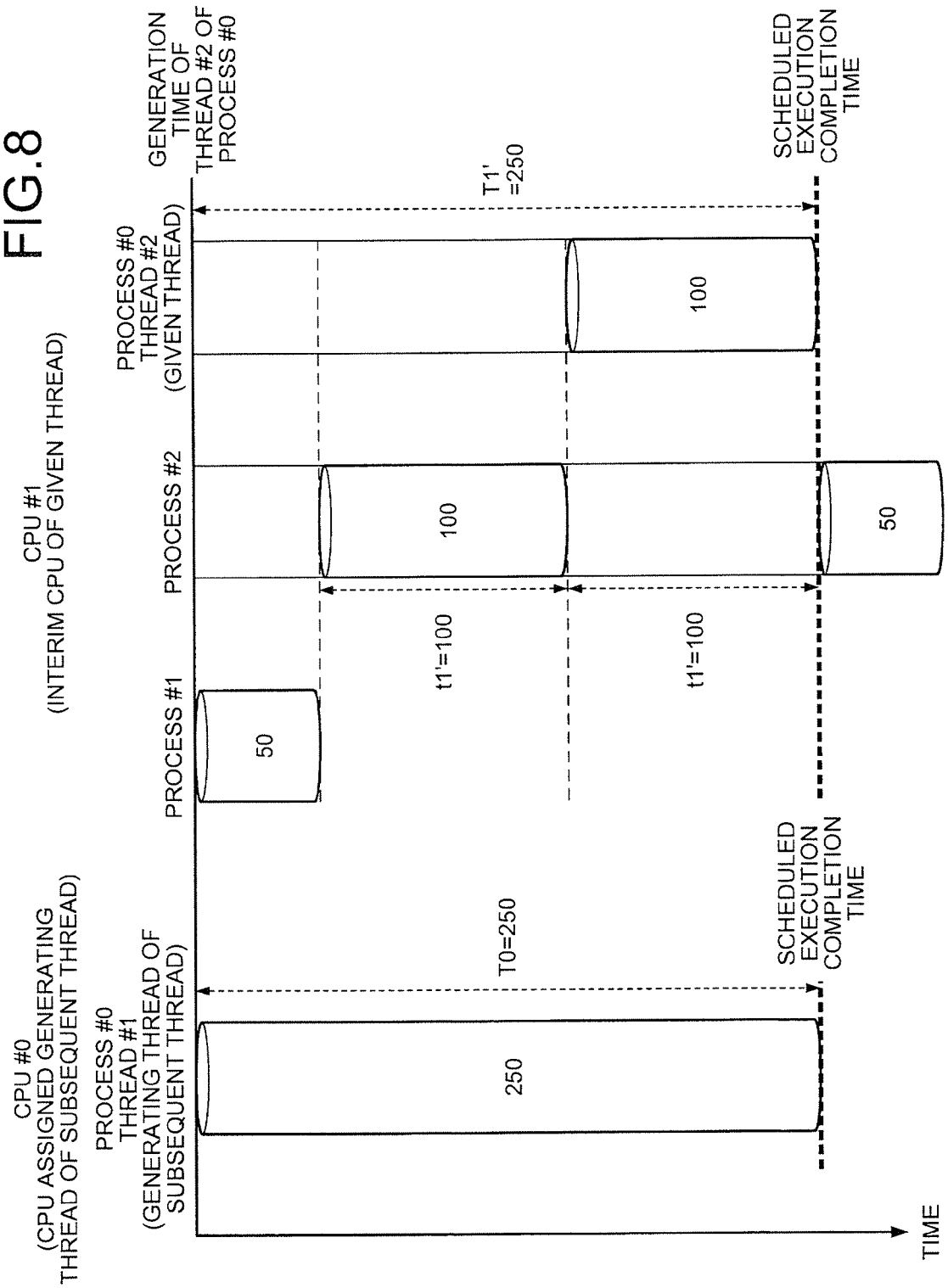
FIG. 8 is a diagram depicting t1' when n1' is 1.

FIG. 8 is a diagram depicting t1′ when n1′ is 1. T0 remains at 250 [ms]. When n1′ is 1, t1′ is 100 [ms] and thus, T0 and T1 are equal to each other, enabling the execution sequence with a subsequent thread that follows the thread #2 of the process #0 to be kept since the execution of the thread #1 of the process #0 is completed at the same time as the completion of execution of the thread #2 of the process #0.

A case in which n1 is 2 will be described $$n1'=2$$

T1′=processing time of process #1+n1′×t1′+processing time of thread #2 of process #0=T0

50 [ms]+2×t1′+100 [ms]=250 [ms]

2×t1′=250 [ms]−150 [ms]

t1′=50 [ms]

A case in which n1′ is 3 will be described.

$$n1'=3$$

T1′=processing time of process #1+n1′×t1′+processing time of thread #2 of process #0=T0

50 [ms]+3×t1′+100 [ms]=250 [ms]

t1′=250 [ms]−150 [ms]

t1′=33.33 [ms]

A case in which n1′ is 4 will be described.

$$n1'=4$$

T1′=processing time of process #1+n1′×t1′+processing time of thread #2 of process #0=T0

50 [ms]+4×t1′+100 [ms]=250 [ms]

250 [ms]−150 [ms]=4·t1′ t1′=25 [ms]

When n1′ is 4, t1′ becomes smaller than t1 and hence, the OS 222 determines any t1′ among 1 to 3 as a new time slice of the CPU #1. The OS 222 notifies the OS 221 (the master OS) of t1′ and given thread assignment permission, via the snoop circuit 203. When the OS 221 (the master OS) receives t1′ and the given thread assignment permission, the OS 221 assigns the given thread to a given CPU and changes the time slice of the given CPU from t1 to t1′.

In a second embodiment, an example will be described in which the clock frequency is changed at the time of execution of a thread having a subsequent thread. The reference clock frequency is 500 [MHz] as described above and the clock frequency (over-clock frequency) for the execution of the thread having a subsequent thread is 1 [GHz]. A difference from the first embodiment in the calculation of T0 and T1 will be described.

The actual processing time of the thread having a subsequent thread is a value obtained by multiplying the processing time included in the thread dependence information 300 by (reference clock frequency/over-clock frequency).

$T1 = 0$

Actual processing time of thread #2 of process

0 = processing time of thread #2 of process

0 × (500[MHz] / 1[GHz]] = 100[ms] × (1/2)

= 50[ms]

$n1$ = actual processing time of thread #2 of process #0 / time slice of CPU #1

= 50[ms] / 30[ms]

= 2(rounded up to whole number)

$n1 \times t1 = 2 \times 30[ms] = 60[ms]$

The processes #1 and #2 are assigned to the CPU #1. The processing time of the process #1 is 50 [ms] and the actual processing time of the thread #2 of the process #0 is 50 [ms]. Hence, the processing time of the process #1 is not more than the actual processing time of the thread #2 of the process #0. Accordingly, the processing time of the process #1 is added to T1.

The processing time of the process #2 is 150 [ms] and the actual processing time of the thread #2 of the process #0 is 50 [ms]. Hence, the processing time of the process #2 is more than the actual processing time of the thread #2 of the process #0. Accordingly, n1×t1 is added to T1. The actual processing time of the thread #2 of the process #0 is further added to T1.

$T1$ = processing time of process #1 + $n1 \times t1$ + actual processing time of thread #2 of process #0

= 50[ms] + 60[ms] + 50[ms]

= 160[ms]

T0 is 250 [ms] and T1 is 160 [ms]. Hence, the OS determines that T0>T1 and notifies the OS (the master OS) of assignment permission. Upon receiving assignment permission, the OS assigns the given thread to the CPU #1. If the given thread has a subsequent thread, the OS enters 1 [GHz] into the clock frequency field 404 of the thread management table 400 corresponding to the identification information of the given thread.

With reference to FIGS. 9 to 14, a scheduling process procedure for scheduling a given thread will be described. The scheduling process procedure is performed by the master CPU and a given CPU to which the given thread is tentatively assigned. FIGS. 9 to 14 are flowcharts corresponding to the first and the second embodiments.

Figure 9:
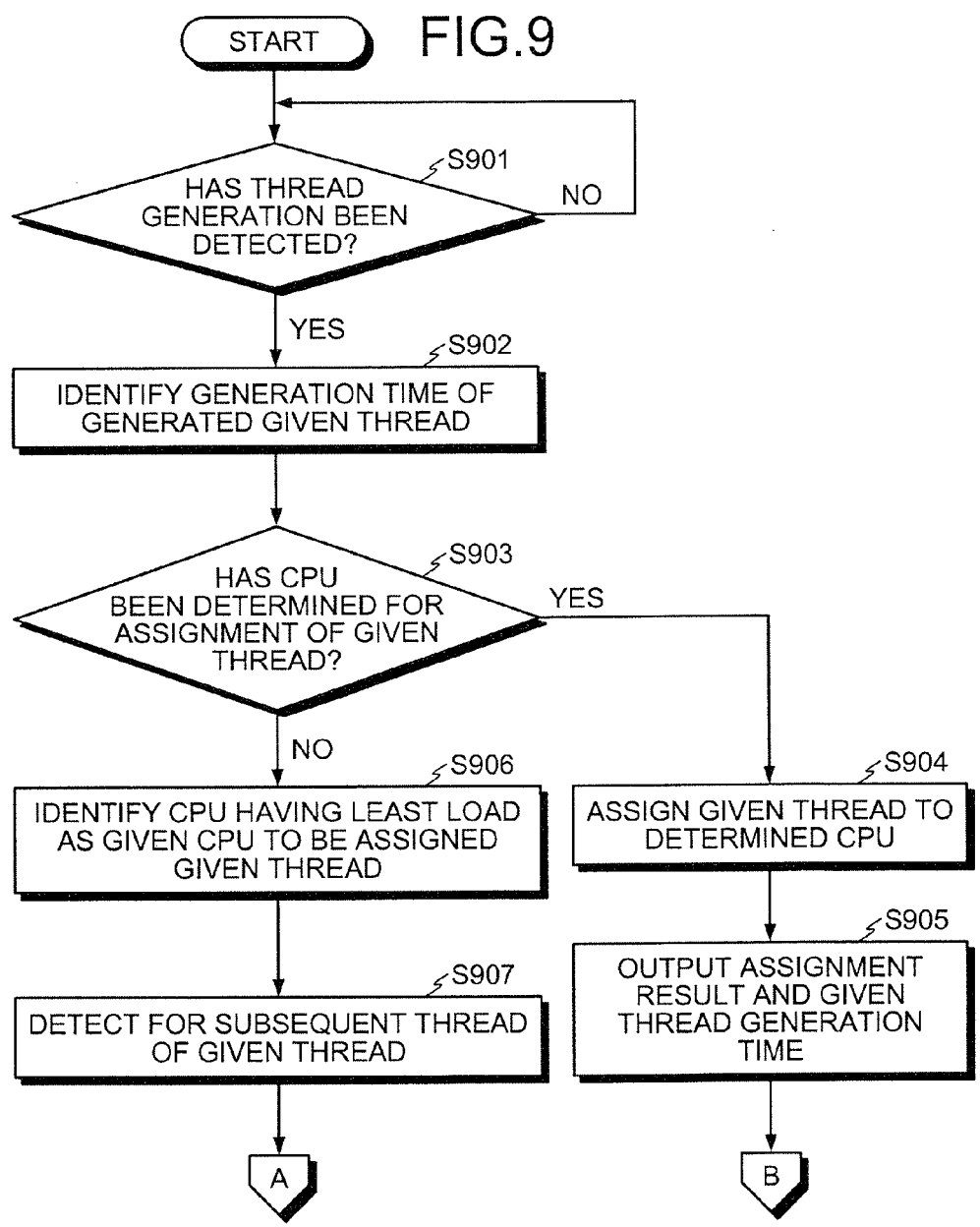
FIGS. 9 and 10 are flowcharts of a scheduling process procedure performed by a master CPU.
Figure 10:
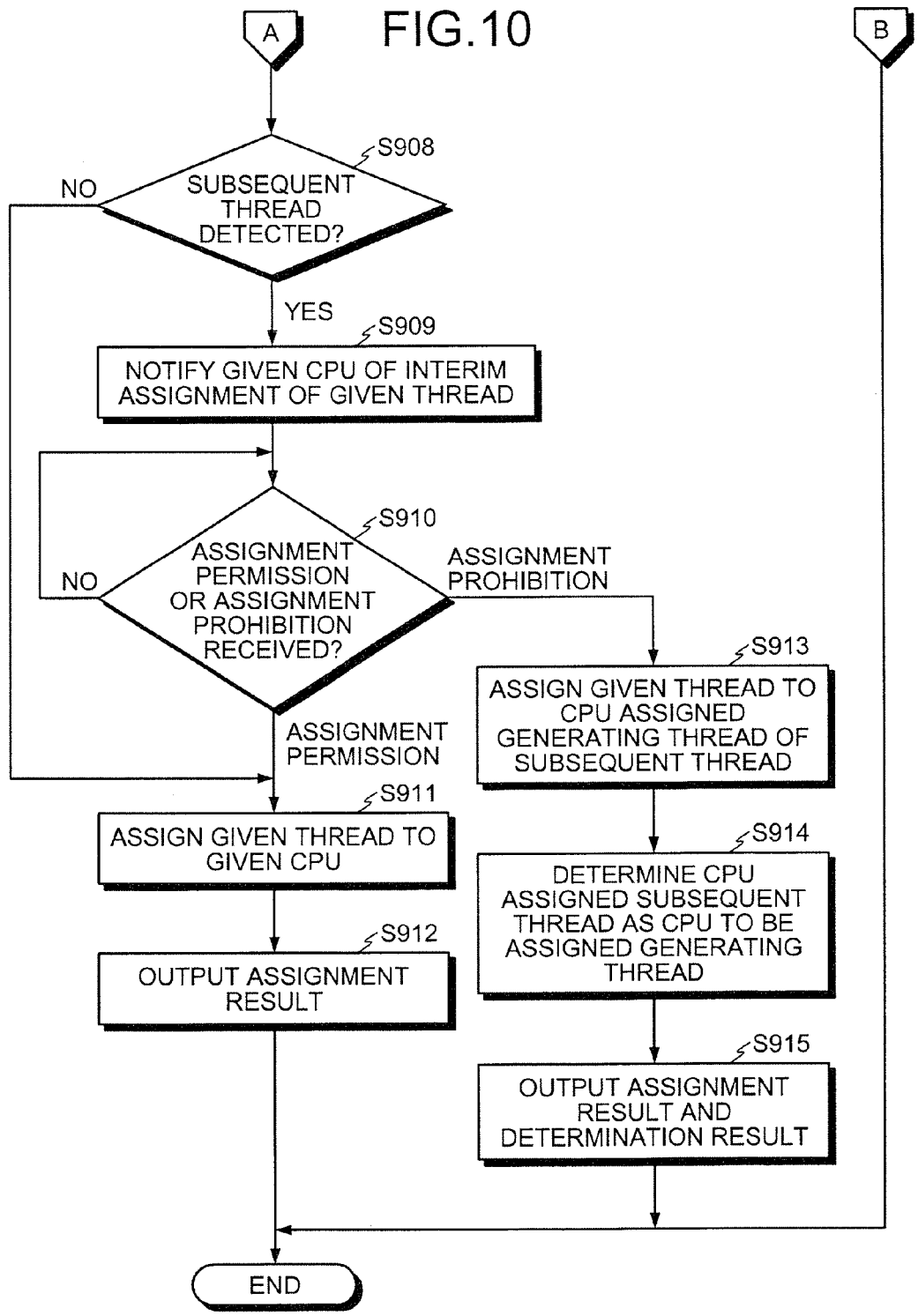

FIGS. 9 and 10 are flowcharts of the scheduling process procedure performed by the master CPU. First, the CPU #0 (the master CPU) determines whether thread generation has been detected (step S901), and if the CPU #0 determines that thread generation has not been detected (step S901: NO), the CPU #0 returns to step S901.

If the CPU #0 determines that thread generation is detected (step S901: YES), the CPU #0 identifies the generation time of the generated thread (step S902) and determines whether a CPU has been determined for assignment of the given thread (step S903). If the CPU #0 determines that a CPU has been determined for assignment of the given thread (step S903: YES), the assigning unit 501 assigns the given thread to the determined CPU (step S904). The CPU #0 then outputs the assignment result and the given thread generation time (step S905) to end the process.

If a CPU has already been determined for the assignment of the given thread, CPU identification information is already stored in the allocated CPU field 403 corresponding to the given thread in the thread management table 400. A case will be described in which the CPU that is to be assigned the given thread has already been determined. The given thread is assumed to have a preceding thread. If it is determined upon the generation of the preceding thread that the scheduled execution completion time of the preceding thread is after the scheduled execution completion time of the given thread, the given thread is assigned to the same CPU as the preceding thread. Thus, at the time of assignment of the preceding thread, the CPU to which the given thread is to be assigned is determined to be the CPU that has been assigned preceding thread.

At step S903, if the CPU #0 determines that the CPU to be assigned the given thread has not been determined (step S903: NO), the CPU #0 identifies a CPU having the least load as the CPU to be assigned the given thread (step S906). The CPU #0 detects for a subsequent thread of the given thread via the detecting unit 502 (step S907) and determines whether a subsequent thread is detected (step S908). For example, the CPU #0 refers to the subsequent thread field 305 corresponding to the given thread in the thread dependence information 300, to detect a subsequent thread.

If the CPU #0 determines that no subsequent thread is detected (step S908: NO), the CPU #0 goes to step S911. No subsequent thread being detected means that the given thread has no subsequent thread and that thread identification information is not entered in the subsequent thread field 305 corresponding to the given thread in the thread dependence information 300. If the CPU #0 determines that a subsequent thread has been detected (step S908: YES), the CPU #0 notifies the given CPU of an interim assignment of the given thread (step S909) and determines if assignment permission or assignment prohibition has been received from the given CPU (step S910).

If the CPU #0 determines that neither assignment permission nor assignment prohibition has been received from the given CPU (step S910: NO), the CPU #0 returns to step S910. If the CPU #0 determines that assignment permission has been received from the given CPU (step S910: assignment permission), the CPU #0 assigns the given thread to the given CPU (step S911) and outputs the assignment result (step S912) to end the process.

At step S910, if the CPU #0 determines that assignment prohibition has been received from the given CPU (step S910: assignment prohibition), the CPU #0 assigns the given thread to the CPU that has been assigned the generating thread of the subsequent thread (step S913). The CPU #0 determines a CPU that has been assigned a subsequent thread of the given thread as the CPU to be assigned the generating thread of the subsequent thread (step S914) and outputs the assignment result and the determination result (step S915). For example, the CPU #0 enters identification information of the determined CPU into the allocated CPU field 403 of the thread having the same identification information in the thread management table 400 stored in the shared memory 209.

Figure 11:
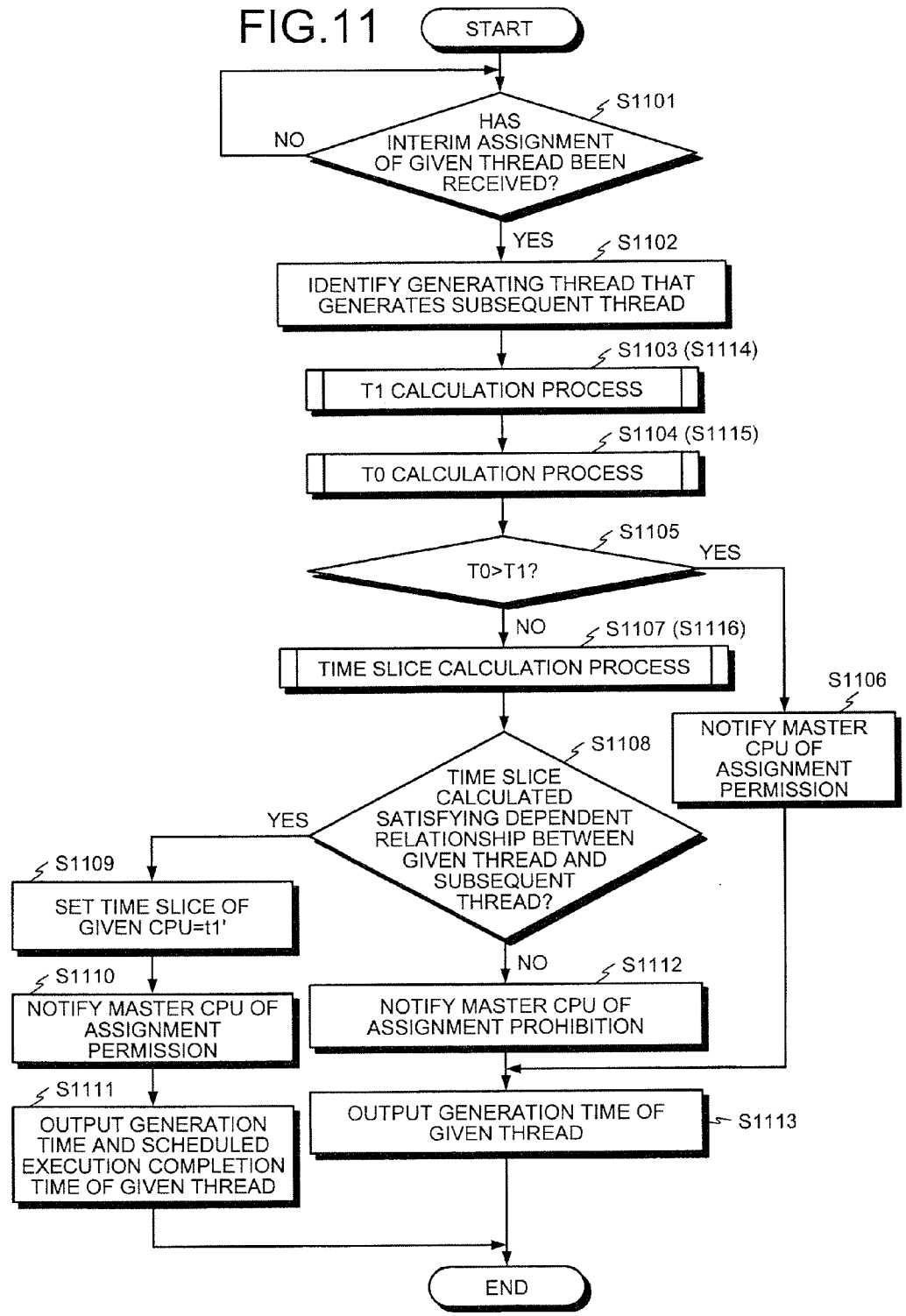
FIG. 11 is flowchart of a calculation process procedure performed by a given CPU.

FIG. 11 is flowchart of a calculation process procedure performed by the given CPU. In FIG. 11, a given CPU regarded as an interim CPU of a given thread determines whether interim assignment of the given thread has been received (step S1101). If the given CPU determines that interim assignment of the given thread has not been received (step S1101: NO), the given CPU returns to step S1101.

If the given CPU determines that interim assignment of the given thread has been received (step S1101: YES), the given CPU identifies a generating thread that generates the subsequent thread of the given thread (step S1102). For example, the given CPU refers to the generating thread field 305 corresponding to the subsequent thread in the thread dependence information 300, to thereby identify a generating thread. The given CPU executes the calculation process of T1 via the second calculating unit 504 (step S1103). T1 is a second time from the generation time of the given thread to the scheduled execution completion time of the given thread. The given CPU executes the calculation process of T0 via the first calculating unit 503 (step S1104). T0 is a first time from the generation time of the given thread to the execution start time of the subsequent thread.

The given CPU determines whether T0>T1 is true (step S1105) and if determined to be true (step S1105: YES), the given CPU notifies the master CPU of assignment permission (step S1106), and proceeds to step S1113. At step S1105, if T0>T1 is determined not to be true (step S1105: NO), the given CPU executes the calculation process of the time slice (t1') via the time slice calculating unit 505 (step S1107). The given CPU determines whether t1' is calculated satisfying the dependent relationship between the given thread and the subsequent thread (step S1108).

If the given CPU determines that t1' satisfies the dependent relationship between the given thread and the subsequent thread (step S1108: YES), the given CPU sets the given CPU time slice=t1' via the setting unit 506 (step S1109). The given CPU notifies the master CPU of assignment permission (step S1110) and outputs the generation time and the scheduled execution completion time of the given thread (step S1111) to end the process. For example, the given CPU enters the generation time into the execution start time field 405 of identification information corresponding to the given thread in the thread dependence information 300 and enters the scheduled execution completion time into the scheduled execution completion time field 406 of the identification information. The scheduled execution completion time is a time that is obtained by adding T1' to the generation time.

At step S1108, if the given CPU determines that t1' does not satisfy the dependent relationship between the given thread and the subsequent thread (step S1108: NO), the given CPU notifies the master CPU of assignment prohibition (step S1112). The given CPU then outputs the generation time of the given thread (step S1113) to end the process.

Figure 12:
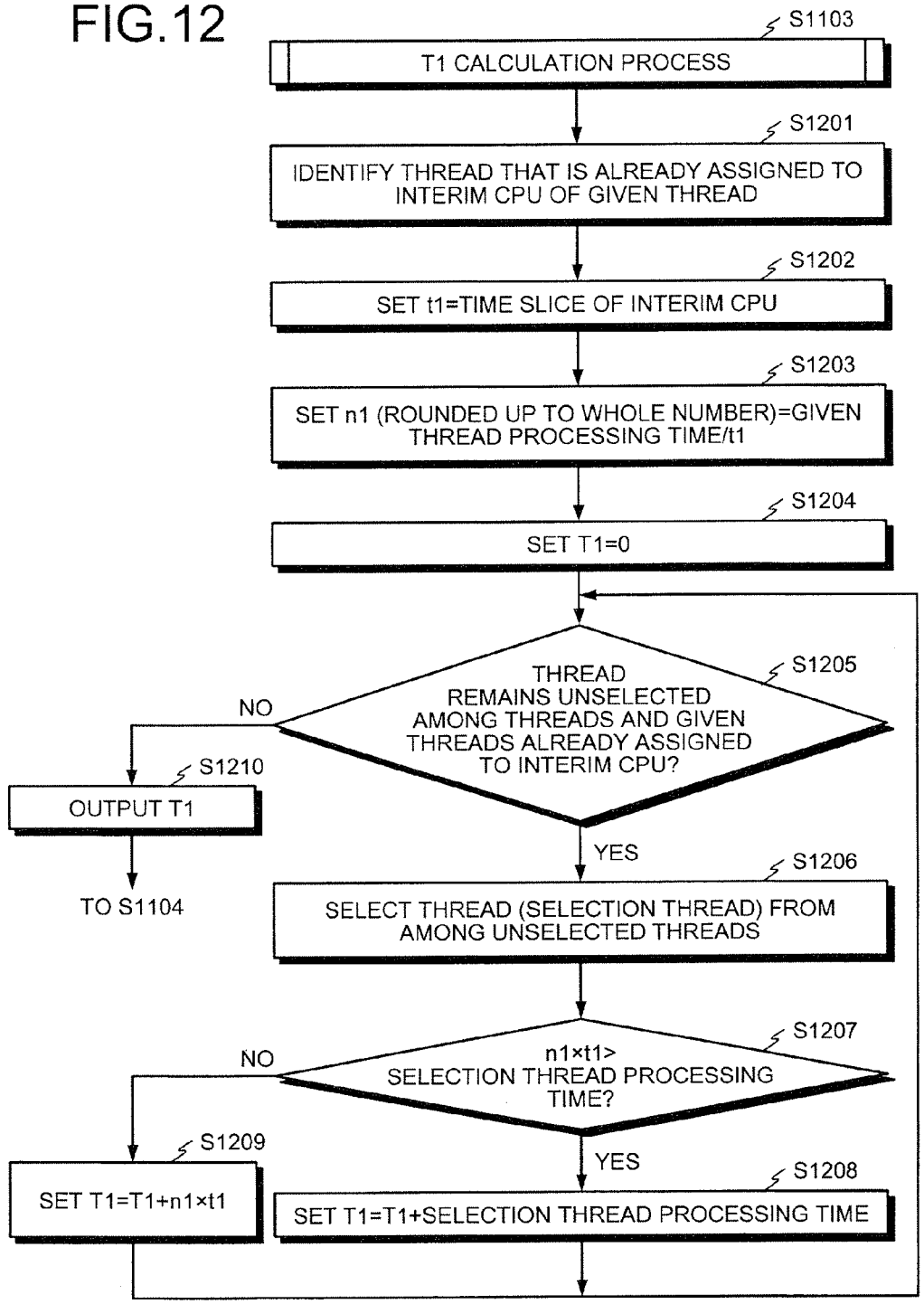
FIG. 12 is a flowchart of a detailed example of a T1 calculation process (step S1103) depicted in FIG. 11.

FIG. 12 is a flowchart of a detailed example of the T1 calculation process (step S1103) depicted in FIG. 11. The given CPU identifies a thread that is already assigned to an interim CPU of the given thread (step S1201). The given CPU sets t1=time slice of interim CPU (step S1202), sets n1 (rounded up to whole number)=given thread processing time/t1 (step S1203), and sets T1=0 (step S1204). The given thread processing time is identified based on the identification information of the given thread from the thread dependence information 300.

The given CPU determines whether any thread remains unselected among threads and given threads already assigned to the interim CPU (step S1205). If the given CPU determines that an unselected thread is present among threads and given threads already assigned to the interim CPU (step S1205: YES), the given CPU selects a thread (selection thread) from among the unselected threads (step S1206).

The given CPU determines whether given thread processing time>selection thread processing time is true (step S1207). The selection thread processing time is identified based on the selection thread identification information from the thread dependence information 300. If given thread processing time>selection thread processing time is determined to be true (step S1207: YES), the given CPU sets T1=T1+selection thread processing time (step S1208), and returns to step S1205. If given thread processing time>selection thread processing time is determined to not be true (step S1207: NO), the given CPU sets T1=T1+n1×t1 (step S1209), and returns to step S1205.

At step S1205, if the given CPU determines that no thread remains unselected (step S1205: NO), the given CPU outputs T1 (step S1210), and proceeds to step S1104. The output form is, for example, such that the output is stored by the given CPU into an accessible storage device.

Figure 13:
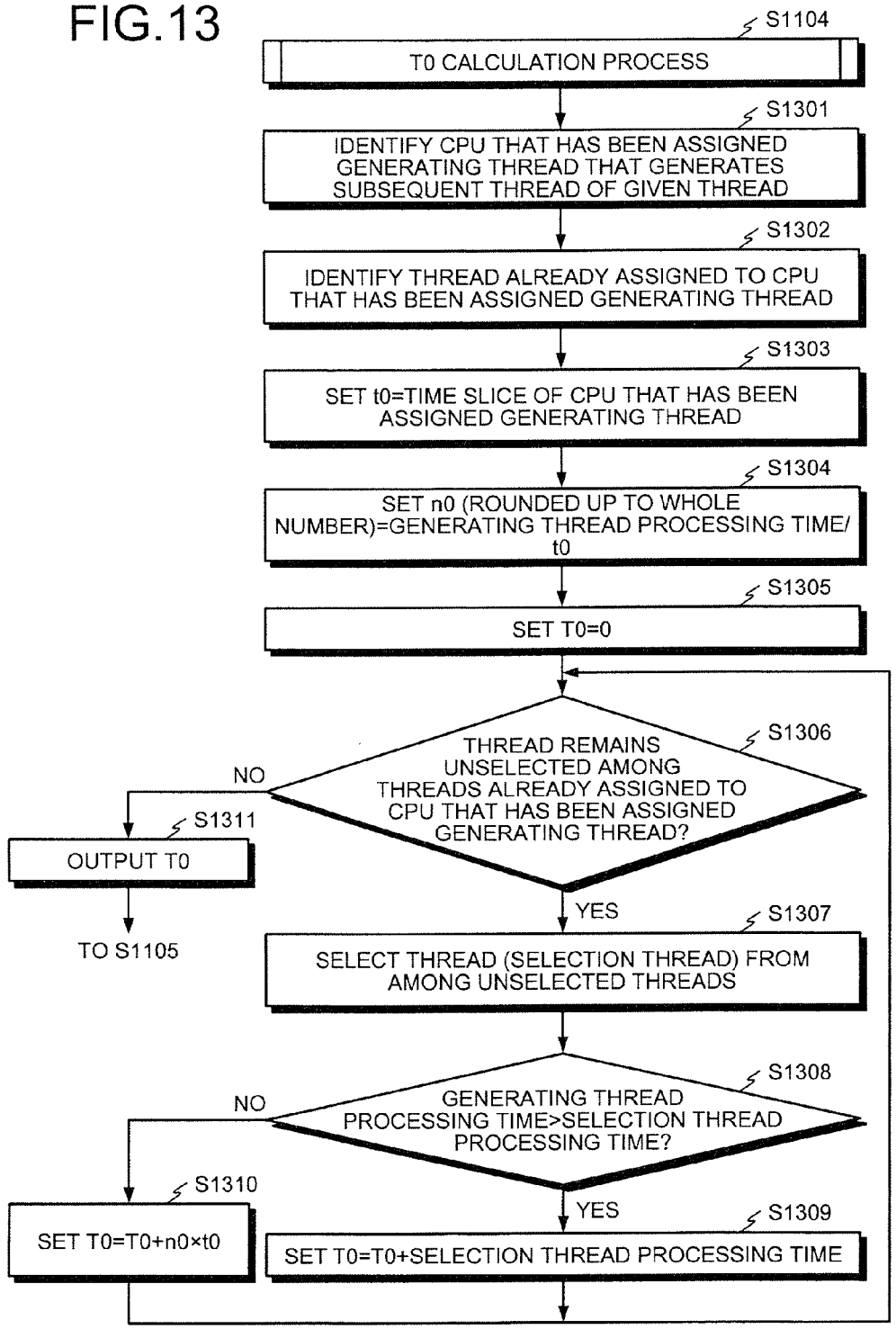
FIG. 13 is a flowchart of a detailed example of an operation (step S1104) depicted in FIG. 11.

FIG. 13 is a flowchart of a detailed example of the operation (step S1104) depicted in FIG. 11. The given CPU identifies the CPU that has been assigned the generating thread that generates a subsequent thread of a given thread (step S1301). The given CPU identifies a thread already assigned to the CPU that has been assigned the generating thread (step S1302). The given CPU sets t0=time slice of the CPU that has been assigned the generating thread (step S1303) and sets n0 (rounded up to whole number)=generating thread processing time/t0 (step S1304). The generating thread processing time is identified based on the identification information of the generating thread from the thread dependence information 300.

The given CPU sets T0=0 (step S1305) and determines whether any thread remains unselected among the threads already assigned to the CPU that has been assigned the generating thread (step S1306). If the given CPU determines that an unselected threads is present (step S1306: YES), the given CPU selects a thread (selection thread) from among the unselected threads (step S1307) and determines whether generating thread processing time>selection thread processing time is true (step S1308). The selection thread processing time is identified based on the selection thread identification information from the thread dependence information 300.

If generating thread processing time>selection thread processing time is determined to be true (step S1308: YES), the given CPU sets T0=T0+selection thread processing time (step S1309), and returns to step S1306. If generating thread processing time>selection thread processing time is determined to not be true (step S1308: NO), the given CPU sets T0=T0+n0×t0 (step S1310), and returns to step S1306.

At step S1206, if the given CPU determines that no unselected thread is present among threads already assigned to the CPU that has been assigned the generating thread (step S1206: NO), the given CPU outputs T0 (step S1311), and proceeds to step S1105. The output form is, for example, such that the output is stored by the given CPU into an accessible storage device.

Figure 14:
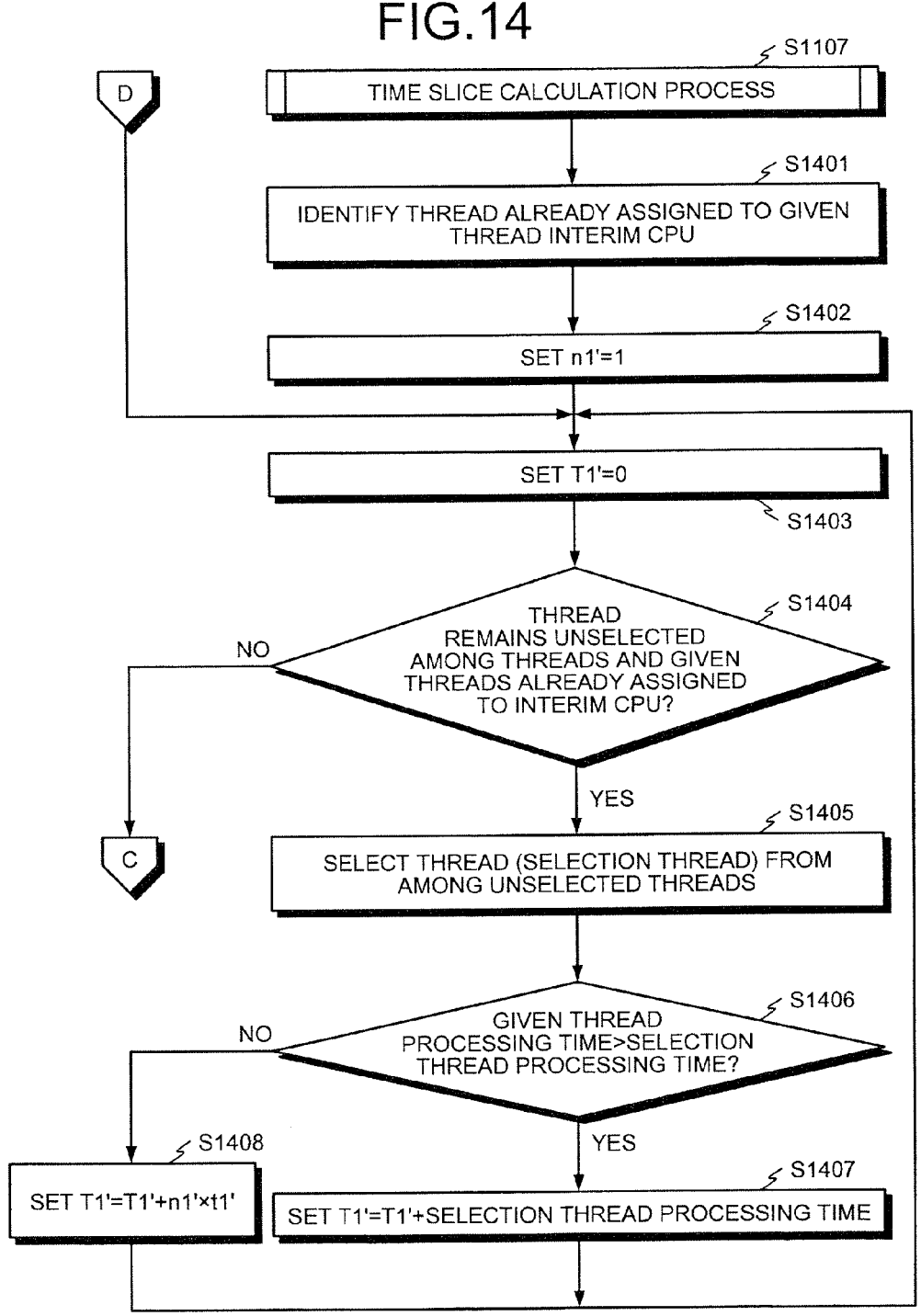
FIGS. 14 and 15 are flowcharts of a detailed example of a time slice calculation process (step S1107) depicted in FIG. 11.
Figure 15:
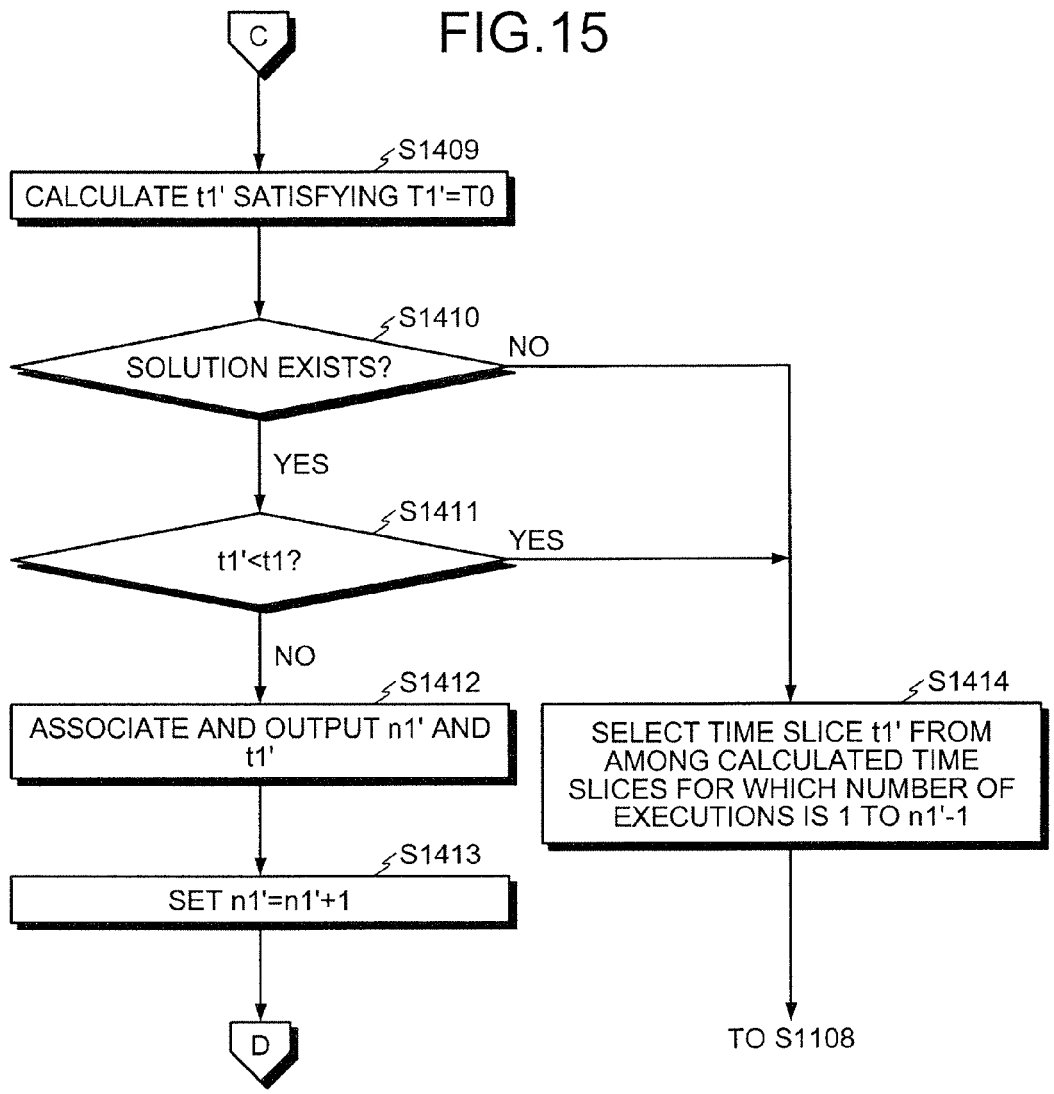

FIGS. 14 and 15 are flowcharts of a detailed example of the time slice calculation process (step S1107) depicted in FIG. 11. The given CPU identifies a thread already assigned to an given thread interim CPU (step S1401), sets n1'=1 (step S1402), and sets T1'=0 (step S1403). n1' denotes the number of times that the given thread is executed until the completion of processing.

The given CPU determines whether any threads remain unselected among the threads and given threads already assigned to the interim CPU (step S1404). If the given CPU determines that an unselected thread is present among the threads and given threads already assigned to the interim CPU (step S1404: YES), the given CPU selects a thread (selection thread) from among the unselected threads (step S1405).

The given CPU determines whether given thread processing time>selection thread processing time is true (step S1406). The given thread processing time is identified based on the given thread identification information from the thread dependence information 300. The selection thread processing time is identified based on the selection thread identification information from the thread dependence information 300.

If given thread processing time>selection thread processing time is determined to not be true (step S1406: NO), the given CPU sets (step S1408), returning to step S1403. If given thread processing time>selection thread processing time is determined to be true (step S1406: YES), the given CPU sets T1'=T1'+selection thread processing time (step S1407), returning to step S1403.

At step S1404, if the given CPU determines that no unselected thread is present among the threads and given threads already assigned to the interim CPU (step S1404: NO), the given CPU calculates t1' satisfying T1'=T0 (step S1409) and determines whether a solution thereof exists (step S1410). Calculation of t1' satisfying T1'=T0 is, for example, calculation of a solution of a linear equation expressed by Equation (5)=T0.

If the given CPU determines that a solution exists (step S1410: YES), the given CPU determines whether t1'<t1 is true (step S1411). If t1'<t1 is determined to not be true (step S1411: NO), the given CPU associates and outputs n1' and t1' (step S1412), sets n1'=n1'+1 (step S1413), and returns to step S1403. The output form is, for example, such that the output is stored by the given CPU into an accessible storage device.

If no solution is determined to exist at step S1410 (step S1410: NO), the given CPU selects a time slice t1' from among calculated time slices for which the number of executions is 1 to n1'−1 (step S1414), and proceeds to step S1108. However, if no solution exists for n1'=1, no selection is made. It is optional and may be determined by the designer which time slice is to be selected from among time slices for which the number of executions is 1 to n1'−1. If t1'<t1 is determined to be true at step S1411 (step S1411: YES), the given CPU proceeds to step S1414.

Flowcharts corresponding to the second embodiment will be described. In the second embodiment, as described above, during the execution of a thread having a subsequent thread, the set over-clock frequency is the clock frequency of the CPU to which the thread is assigned. The difference between the first and the second embodiments lies in steps S1103, S1104, and S1107 depicted in FIG. 11. In the second embodiment, steps S1114, S1115, and S1116 are executed in place of steps s1103, S1104, and S1107, respectively.

Figure 16:
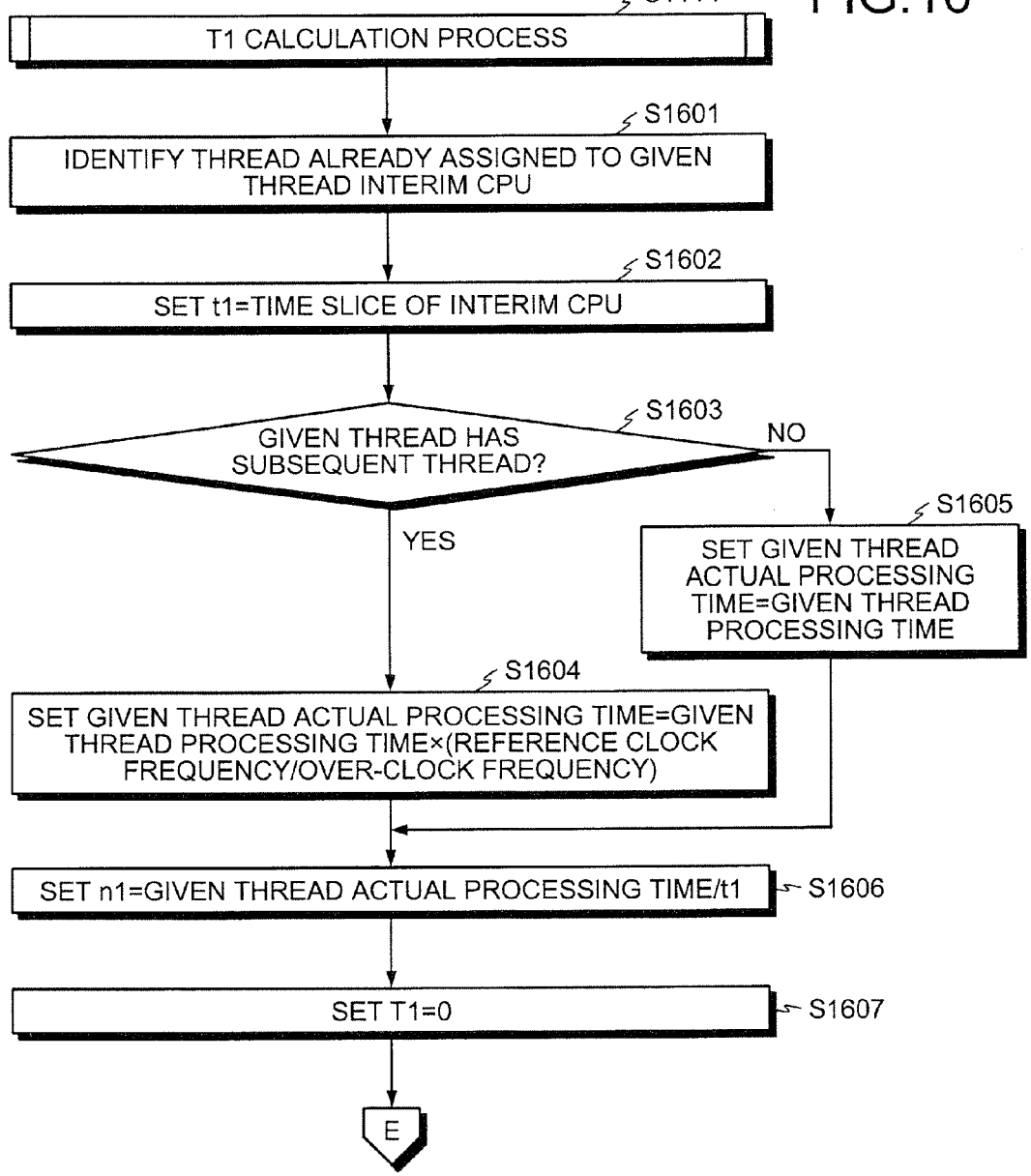
FIGS. 16 and 17 are flowcharts of a detailed example of the T1 calculation process (step S1114) depicted in FIG. 11.
Figure 17:
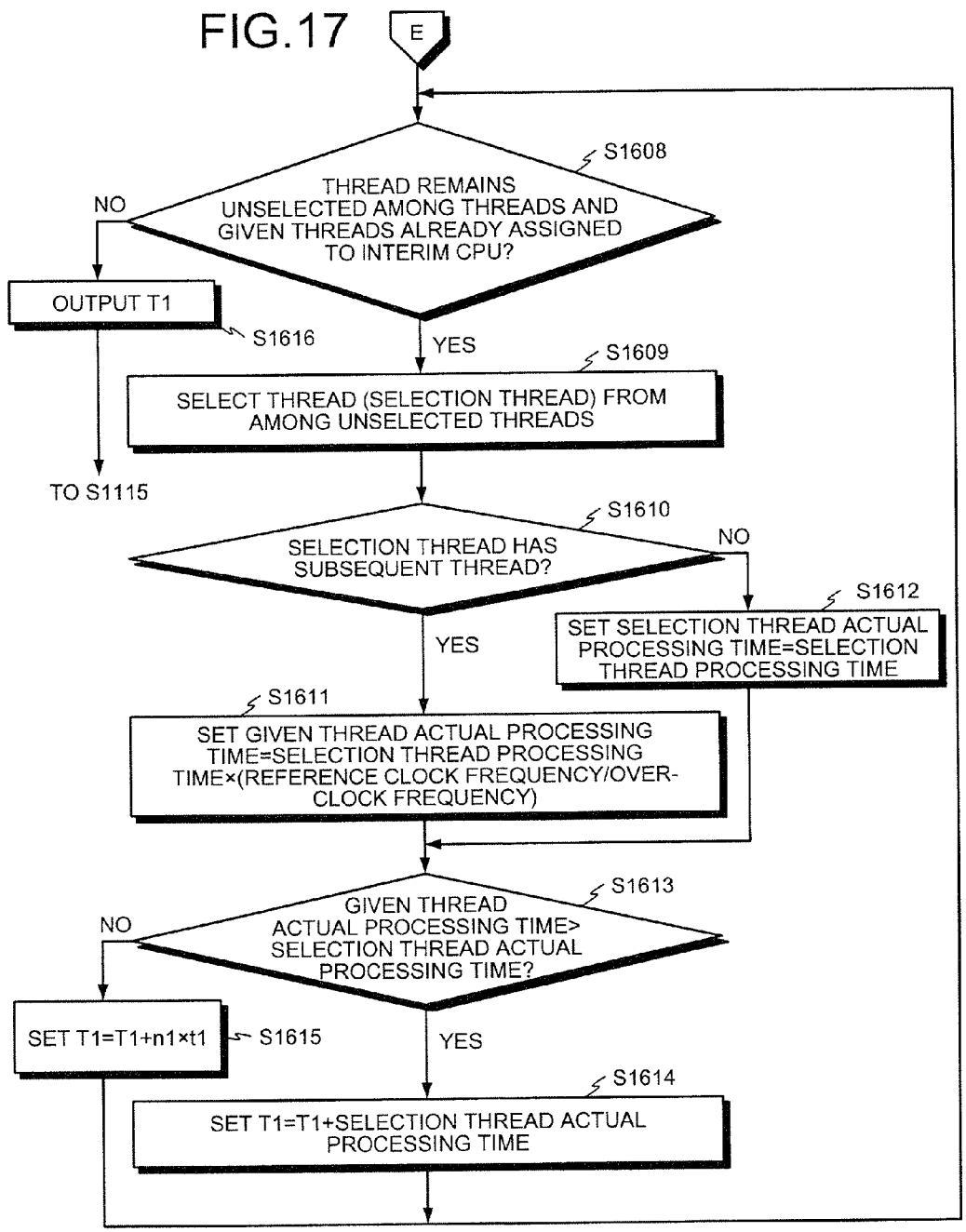

FIGS. 16 and 17 are flowcharts of a detailed example of the T1 calculation process (step S1114) depicted in FIG. 11. The given CPU identifies a thread already assigned to a given thread interim CPU (step S1601). The given CPU sets t1=time slice of the interim CPU (step S1602) and determines whether the given thread has a subsequent thread (step S1603).

If the given CPU determines that the given thread has a subsequent thread (step S1603: YES), the given CPU sets given thread actual processing time=given thread processing time×(reference clock frequency/over-clock frequency) (step S1604), and proceeds to step S1606. The given thread processing time is identified based on the given thread identification information from the thread dependence information 300.

If the given CPU determines that the given thread has no subsequent thread (step S1603: NO), the given CPU sets given thread actual processing time=given thread processing time (step S1605), and proceeds to step S1606. Subsequent to step S1604 or S1605, the given CPU sets n1=given thread actual processing time/t1 (step S1606).

The given CPU sets T1=0 (step S1607) and determines whether any thread remains unselected among threads and given threads already assigned to the interim CPU (step S1608). If the given CPU determines that unselected threads are present among the threads and given threads already assigned to the interim CPU (step S1608: YES), the given CPU selects a thread (selection thread) from among the unselected threads (step S1609).

The given CPU determines whether the selection thread has a subsequent thread (step S1610). If the given CPU determines that the selection thread has a subsequent thread (step S1610: YES), the given CPU sets given thread actual processing time=selection thread processing time×(reference clock frequency/over-clock frequency) (step S1611), and proceeds to step S1613. The selection thread processing time is identified based on the selection thread identification information from the thread dependence information 300. If the given CPU determines that the selection thread has no subsequent thread (step S1610: NO), the given CPU sets selection thread actual processing time=selection thread processing time (step S1612), proceeding to step S1613.

Subsequent to step S1611 or S1612, the given CPU determines whether given thread actual processing time>selection thread actual processing time is true (step S1613). If given thread actual processing time>selection thread actual processing time is determined to be true (step S1613: YES), the given CPU sets T1=T1+selection thread actual processing time (step S1614), and returns to step S1608. If given thread actual processing time>selection thread actual processing time is determined to not be true (step S1613: NO), the given CPU sets T1=T1+n1×t1 (step S1615), and returns to step S1608.

At step S1608, if the given CPU determines that no unselected thread is present among the threads and given threads already assigned to the interim CPU (step S1608: NO), the given CPU outputs T1 (step S1616), and proceeds to step S1115. The output form is, for example, such that the output is stored by the given CPU into an accessible storage device.

Figure 18:
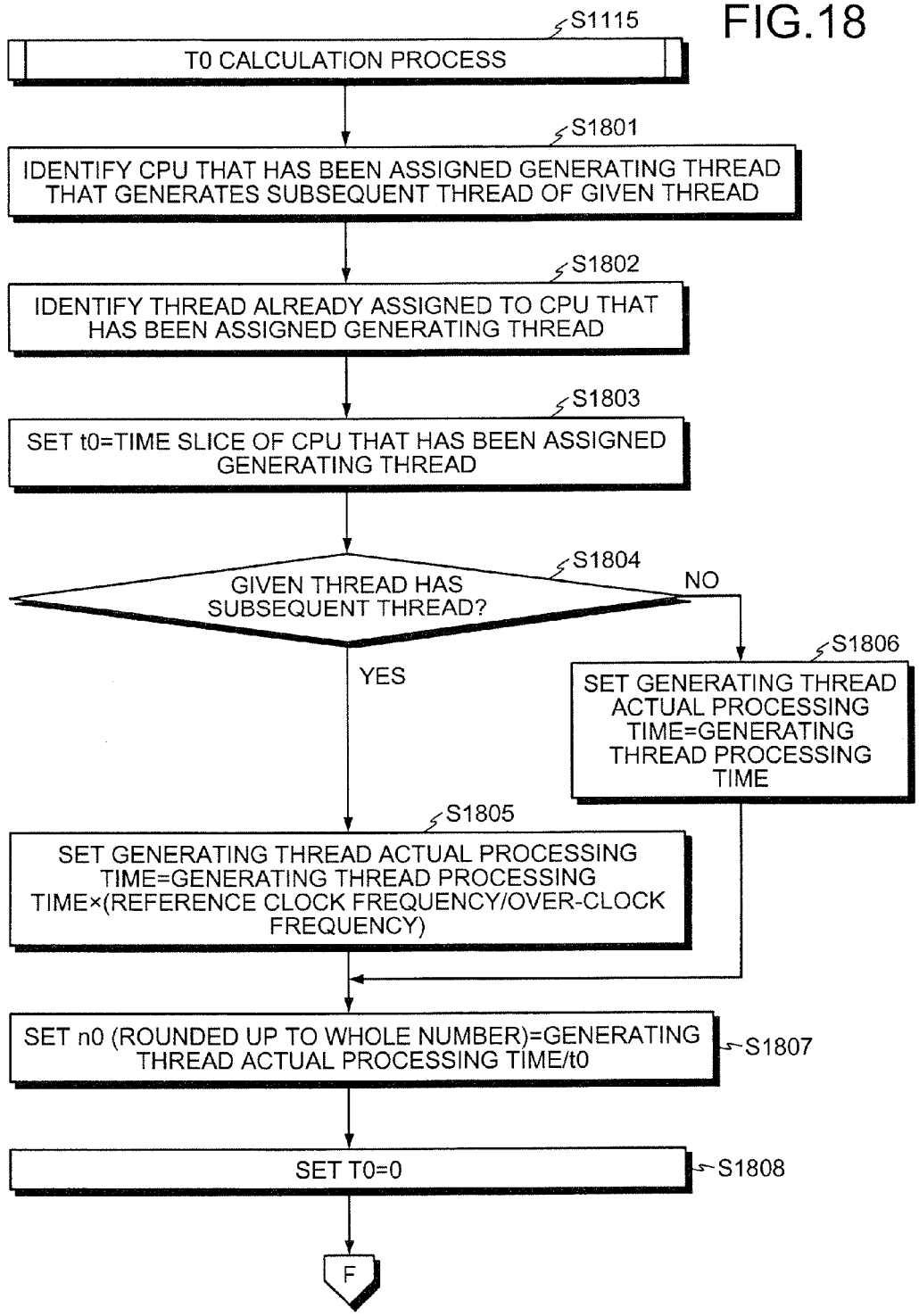
FIGS. 18 and 19 are flowcharts of a detailed example of a T0 calculation process (step S1115) depicted in FIG. 11.
Figure 19:
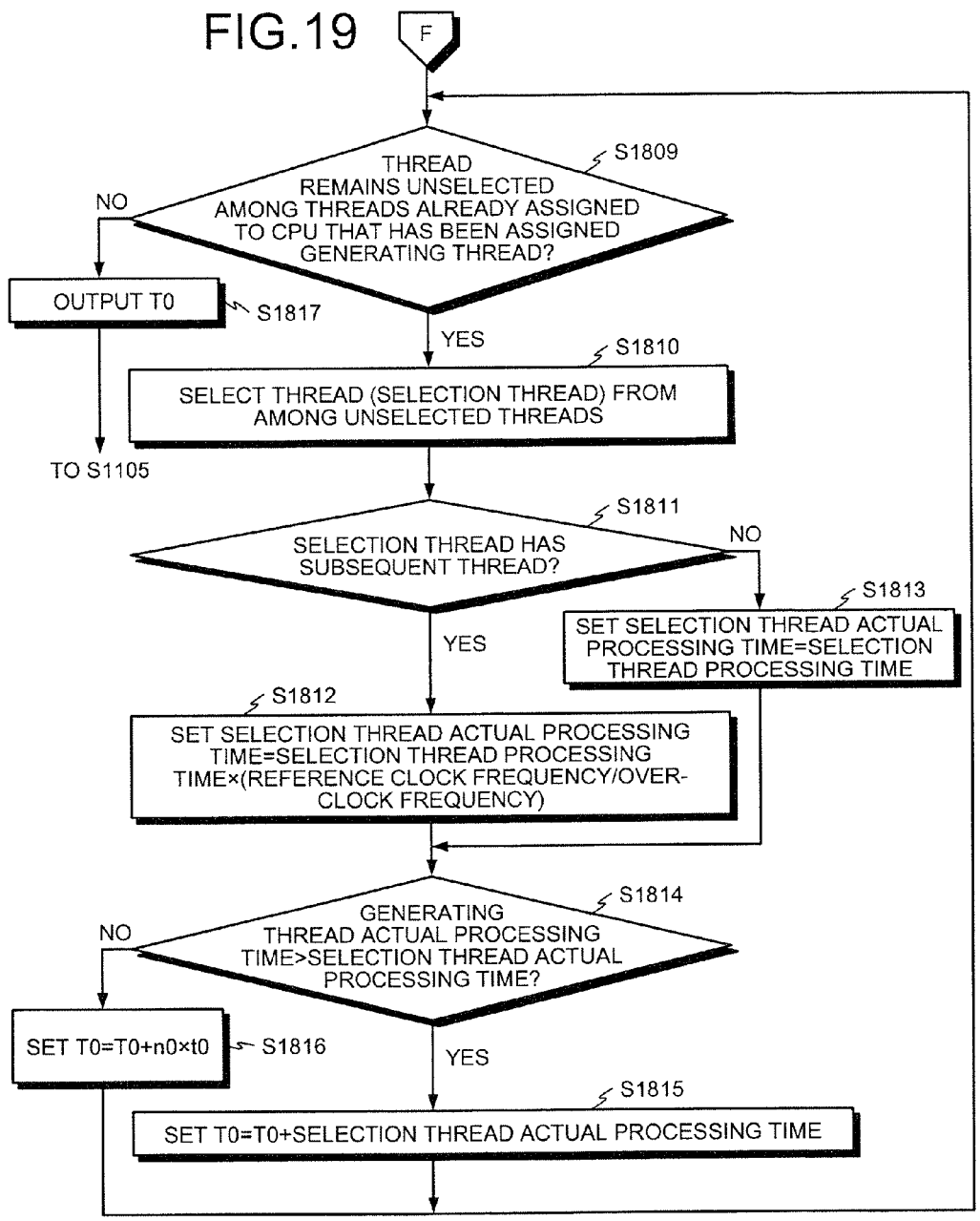

FIGS. 18 and 19 are flowcharts of a detailed example of the T0 calculation process (step S1115) depicted in FIG. 11. The given CPU identifies a CPU that has been assigned a generating thread that generates a subsequent thread of a given thread (step S1801) and identifies a thread already assigned to the CPU that has been assigned the generating thread (step S1802). The given CPU sets t0=time slice of the CPU that has been assigned the generating thread (step S1803) and determines whether the given thread has a subsequent thread (step S1804).

If the given CPU determines that the given thread has a subsequent thread (step S1804: YES), the given CPU sets generating thread actual processing time=generating thread processing time×(reference clock frequency/over-clock frequency) (step S1805), and proceeds to step S1807. The generating thread processing time is identified based on the generating thread identification information from the thread dependence information 300. If the given CPU determines that the given thread has no subsequent thread (step S1804: NO), the given CPU sets generating thread actual processing time=generating thread processing time (step S1806), and proceeds to step S1807.

Subsequent to step S1805 or S1806, the given CPU sets n0 (rounded up to whole number)=generating thread actual processing time/t0 (step S1807). n0 is the number of times that the generating thread is executed until the completion of processing. The given CPU sets T0=0 (step S1808) and determines whether any thread remains unselected among the threads already assigned to the CPU that has been assigned the generating thread (step S1809). If the given CPU determines that unselected threads are present among the threads and given threads already assigned to the CPU that has been assigned the generating thread (step S1809: YES), the given CPU selects a thread (selection thread) from among the unselected threads (step S1810).

The given CPU then determines whether the selection thread has a subsequent thread (step S1811): If the given CPU determines that the selection thread has a subsequent thread (step S1811: YES), the given CPU sets selection thread actual processing time=selection thread processing time×(reference clock frequency/over-clock frequency) (step S1812), and proceeds to step S1814. The selection thread processing time is identified based on the selection thread identification information from the thread dependence information 300. If the given CPU determines that the selection thread has no subsequent thread (step S1811: NO), the given CPU sets selection thread actual processing time=selection thread processing time (step S1813), and proceeds to step S1814.

Subsequent to step S1812 or S1813, the given CPU determines whether generating thread actual processing time>selection thread actual processing time is true (step S1814). If generating thread actual processing time>selection thread actual processing time is determined to be true (step S1814: YES), the given CPU sets T0=T0+ selection thread actual processing time (step S1815), and returns to step S1809. If generating thread actual processing time>selection thread actual processing time is determined to not be true (step S1814: NO), the given CPU sets T0=T0+n0×t0 (step S1816), and returns to step S1809.

At step S1809, if the given CPU determines that no thread remains unselected among the threads and given threads already assigned to the CPU that has been assigned the generating thread (step S1809: NO), the given CPU outputs T1 (step S1817), and proceeds to step S1105. The output form is, for example, such that the output is stored by the given CPU into an accessible storage device.

Figure 20:
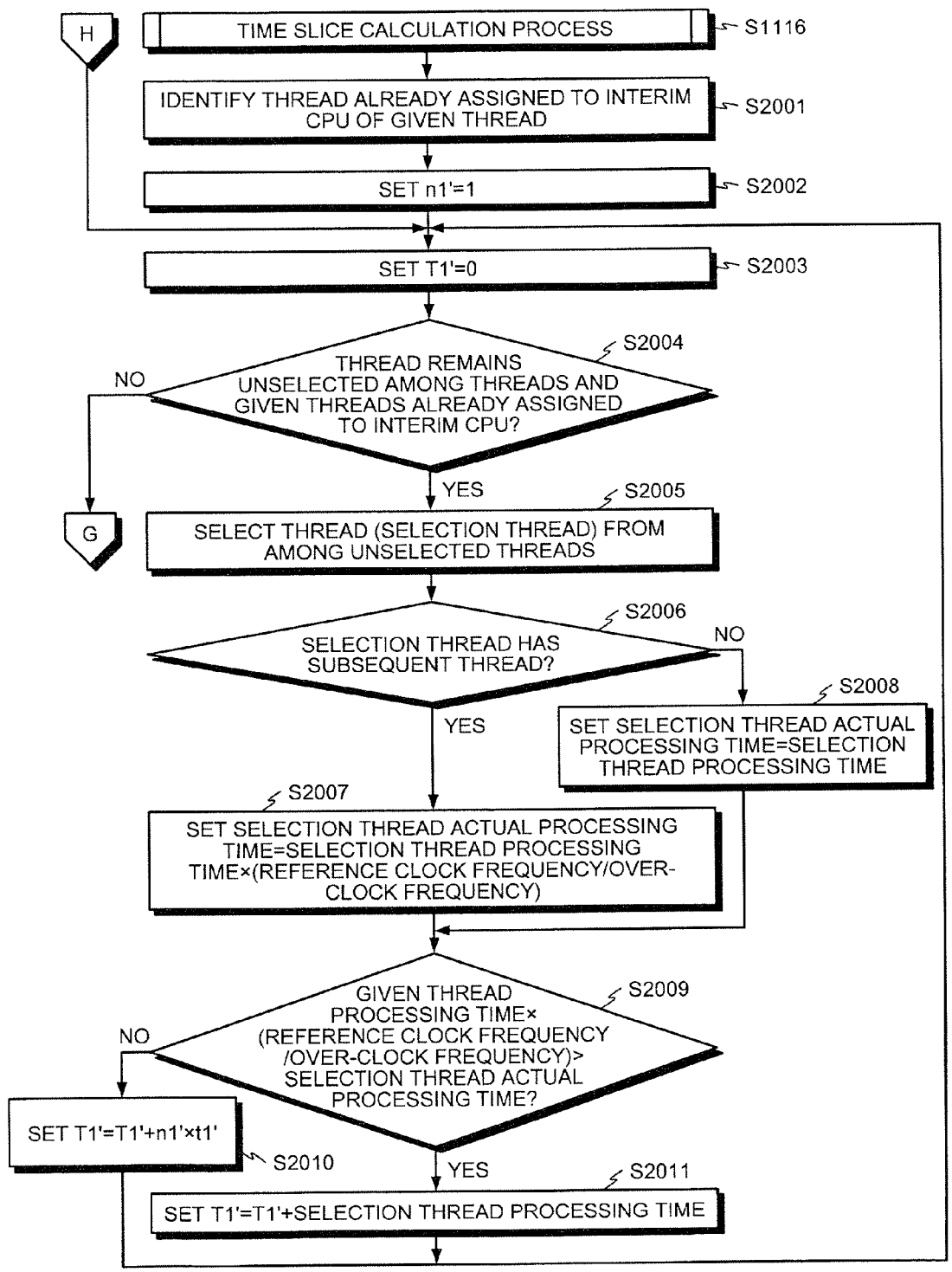

Since the clock frequency at the time of execution a thread varies according to thread, the clock frequency is changed in each CPU at each task switching, task dispatching, and processing completion. With reference to FIGS. 20 and 21, an example will be described in which the clock frequency is changed.

FIGS. 20 and 21 are flowcharts of a detailed example of the time slice calculation process (step S1116) depicted in FIG. 11. The given CPU identifies a thread already assigned to an interim CPU of a given thread (step S2001) and sets n1'=1 (step S2002) and T1'=0 (step S2003). n1' denotes the number of times the given thread is executed until processing is completed.

The given CPU determines whether any thread remains unselected among threads and given threads already assigned to the interim CPU (step S2004). If the given CPU determines that an unselected thread is present among the threads and given threads already assigned to the interim CPU (step S2004: YES), the given CPU selects a thread (selection thread) from among the unselected threads (step S2005).

The given CPU determines whether the selection thread has a subsequent thread (step S2006). If the given CPU determines that the selection thread has a subsequent thread (step S2006: YES), the given CPU sets selection thread actual processing time=selection thread processing time× (reference clock frequency/over-clock frequency) (step S2007), and proceeds to step S2009. The selection thread processing time is identified based on the selection thread identification information from the thread dependence information 300. If the given CPU determines that the selection thread has no subsequent thread (step S2006: NO), the given CPU sets selection thread actual processing time=selection thread processing time (step S2008), and proceeds to step S2009.

Subsequent to step S2007 or S2008, the given CPU determines whether given thread processing time×(reference clock frequency/over-clock frequency)>selection thread actual processing time is true (step S2009). If given thread processing time×(reference clock frequency/over-clock frequency)>selection thread actual processing time is determined to not be true (step S2009: NO), the given CPU sets T1'=T1'+n1'×t1' (step S2010), and returns to step S2003. The given thread processing time is identified based on the given thread identification information from the thread dependence information 300.

If given thread processing time×(reference clock frequency/over-clock frequency)>selection thread actual processing time is determined to be true (step S2009: YES), the given CPU sets T1'=T1'+selection thread processing time (step S2011), and returns to step S2003. At step S2004, if the given CPU determines that no unselected thread remains among the threads and given threads already assigned to the interim CPU (step S2004: NO), the given CPU calculates t1' satisfying T1'=T0 (step S2012) and determines whether a solution thereof exists (step S2013). Calculation of t1' satisfying T1'=T0 is, for example calculation a solution of a linear equation expressed by Equation (5)=T0.

If the given CPU determines that a solution exists (step S2013: YES), the given CPU determines whether t1'<t1 is true (step S2014). If t1'<t1 is determined to not be true (step S2014: NO), the given CPU associates and outputs n1' and t1' (step S2015), sets n1'=n1'+1 (step S2016), and returns to step S2003. The output form is, for example, such that the output is stored by the given CPU into an accessible storage device.

If no solution is determined to exist at step S2013 (step S2013: NO), the given CPU proceeds to step S2017. If the given CPU determines that t1'<t1 is true at step S2014 (step S2014: YES), the given CPU proceeds to step S2017.

Subsequent to "NO" at step S2013 or "YES" at step S2014, the given CPU selects a time slice as t1' from among time slices calculated for which the number of executions is 1 to n1'−1 (step S2017), and proceeds to step S1108. If no solution exists for n1'=1, no selection is made. It is optional and may be determined by the designer which time slice is to be selected from among time slices for which the number of execution is 1 to n1'−1.

FIG. 22 is a flowchart of an information processing procedure performed by the CPUs. Although the processing performed by each CPU, description will be given taking the CPU #0 as an example. The CPU #0 determines whether the CPU #0 has detected an event (step S2201). If the CPU #0 determines that no event has been detected (step S2201: NO), the CPU #0 returns to step S2201.

If the CPU #0 determines that thread processing completion has been detected (step S2201: thread processing completion), the CPU #0 determines whether an executable thread is present (step S2202). If the CPU #0 determines that no executable threads are present (step S2202: NO), the CPU #0 returns to step S2201. If the CPU #0 determines that an executable thread is present (step S2202: YES), the CPU #0 selects a thread from among the executable threads (step S2203), and proceeds to step S2204.

If the CPU #0 determines a task dispatch or a task switch has been detected (step S2201: task dispatch or task switch), the CPU #0 determines if the thread for which an event has been detected or the selected thread has a subsequent thread (step S2204). If the CPU #0 determines that the thread for which an event has been detected or the selected thread has a subsequent thread (step S2204: YES), the CPU #0 notifies the clock supply circuit 210 of a setting for the over-clock frequency (step S2205).

If the CPU #0 determines that neither the thread for which an event has been detected or the selected thread has a subsequent thread (step S2204: NO), the CPU #0 notifies the clock supply circuit 210 of a setting for the reference clock frequency via the changing unit 507 (step S2206). For example, the frequency setting notification is sent to the clock supply circuit 210 correlating the CPU identification information and the frequency.

Subsequent to step S2205 or S2206, the CPU #0 determines whether the CPU #0 has received notification of frequency change completion (step S2207). If the CPU #0 determines that no notification of frequency change completion has been received (step S2207: NO), the CPU #0 returns to step S2207. If the CPU #0 determines that notification of frequency change completion has been received (step S2207: YES), the CPU #0 initiates execution (step S2208), and returns to step S2201.

FIG. 23 is a flowchart of a setting process procedure performed by the clock supply circuit 210. The clock supply circuit 210 determines whether the clock supply circuit 210 has received frequency setting notification (step S2301). If the clock supply circuit 210 determines that no frequency setting notification has been received (step S2301: NO), the clock supply circuit 210 returns to step S2301.

On the other hand, if the clock supply circuit 210 determines that frequency setting notification has been received (step S2301: YES), the clock supply circuit 210 sets the frequency supplied to the CPU that sent the setting notification to a frequency indicated in the setting notification (step S2302). For the clock frequency setting, as described above, when the clock supply circuit 210 receives clock frequency setting notification from a CPU, the clock supply circuit 210 sets a flag corresponding to the received CPU identification information to a value indicating reception of clock frequency setting notification. The clock supply circuit 210 gives notification of frequency change completion (step S2303).

Although a time slice for which T0 and T1 are equivalent is calculated using calculation equations in the first and the second embodiments, configuration is not limited hereto and a time slice for which T0 and T1 are equivalent may be identified while the time slice is varied for each given time.

As described, according to the multi-task scheduling method and the multi-core processor system, whether the execution of a preceding thread assigned to the first CPU is completed prior to the completion of execution of a generating thread of a subsequent thread assigned to the second CPU is determined. In other words, the time slice of each CPU is adjusted such that the execution of the preceding thread assigned to the first CPU is completed prior to the completion of execution of the generating thread by regarding the start of execution of the subsequent thread as the completion of execution of the generating thread. This eliminates the need for program codes and enables the defined execution sequence among threads to be kept without any performance degradation consequent to waits for execution.

By calculating the time slice of the first CPU such that the first time is substantially equal to the second time, the subsequent thread can be executed after the completion of processing of the preceding thread, so that the execution sequence can be maintained.

When calculations do not yield a time slice of the first CPU by which the first time becomes substantially equal to the second time, as with the preceding thread, the subsequent thread is assigned to the first CPU. As a result, as the thread execution becomes identical to the execution of the subsequent thread and the preceding thread by the single-core processor system, thereby enabling the execution sequence to be maintained.

If the time slice of the first CPU is adjusted such that the first time becomes substantially equal to the second time, the subsequent thread is assigned to a CPU having the least load, resulting in a reduced processing time for a process that includes the preceding thread, the subsequent thread, and the generating thread.

During the execution of the preceding thread, the clock frequency of the clock supplied to the first CPU is greater than the clock frequency for the execution of the other threads. As a result, the actual processing time of the preceding thread can be reduced. Power saving can be achieved by increasing the clock frequency during the execution of the preceding thread alone and without increasing the clock frequency during the execution of the other threads.

The subsequent thread is detected based on the thread dependence information, thereby enabling code analysis of a process having the subsequent thread to be omitted at the time of scheduling, resulting in a reduced processing time of the process.

The multi-task scheduling method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-task scheduling method comprising:
assigning a first thread and at least one fourth thread to a first processor, alternatively, for execution during a first time slice;
detecting a second thread that is executed after the first thread;
calculating based on a load of a processor that is assigned a third thread that generates the second thread, a first time that lasts until a start of the second thread;
calculating a second time that lasts until completion of execution of the first thread; and
changing the first time slice to a second time slice when the second time is greater than the first time, the first time slice and the second time slice being intervals for alternating the first thread and the at least one fourth thread, the second time slice being longer than the first time slice, and the second time slice being calculated based on the processing time of the first thread and based on a number of times the first thread is executed until completion.

2. The multi-task scheduling method according to claim 1, further comprising
calculating the second time slice such that the first time becomes substantially equal to the second time.

3. The multi-task scheduling method according to claim 2, further comprising
assigning the second thread to the first processor when the calculating of the second time slice fails to yield the second time slice such that the first time becomes substantially equal to the second time.

4. The multi-task scheduling method according to claim 1, further comprising
assigning the second thread to a processor having a least load.

5. The multi-task scheduling method according to claim 1, comprising
changing a clock frequency during the execution of the first thread.

6. The multi-task scheduling method according claim 1, wherein
the detecting includes detecting the second thread based on thread dependence information.

7. The multi-task scheduling method according to claim 1, wherein
the second time slice is calculated as:

$$T1' = \sum_{n=0}^{N-1} \text{if}(n-th \text{ thread processing time} \leq \text{given thread processing time})n-th \text{ thread processing time ELSE } n1' \times t1'.$$

8. The multi-task scheduling method according to claim 1, wherein
the first time slice is a time slice for the first thread, and the at least one fourth thread and the second time slice are longer than the first time slice for both the first thread and the at least one fourth thread.

9. A multi-core processor system comprising:
a processor programmed to:
assign a first thread and at least one fourth thread to a first processor, alternatively, for execution during a first time slice;
detect a second thread that is executed after the first thread assigned to the first processor;
calculate based on a load of a processor that is assigned a third thread that generates the detected second thread, a first time that lasts until a start of the second thread;
calculate a second time that last until completion of execution of the first thread; and
set the first time slice to a second time slice when the calculated second time is greater than the calculated first time, the first time slice and the second time slice being intervals for alternating the first thread and the at least one fourth thread, the second time slice being longer than the first time slice, and the second time slice being calculated based on the processing time of the first thread and based on the number of times the first thread is executed until completion.

* * * * *